United States Patent
Chen et al.

(10) Patent No.: US 10,281,285 B2
(45) Date of Patent: *May 7, 2019

(54) METHOD AND APPARATUS FOR PROVIDING A MACHINE LEARNING APPROACH FOR A POINT-BASED MAP MATCHER

(71) Applicant: HERE GLOBAL B.V., Eindhoven (NL)

(72) Inventors: Qin Chen, Lisle, IL (US); Jaime Ballesteros, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,406

(22) Filed: Jul. 30, 2018

(65) Prior Publication Data

US 2018/0335307 A1 Nov. 22, 2018

Related U.S. Application Data

(63) Continuation of application No. 15/597,999, filed on May 17, 2017, now Pat. No. 10,060,751.

(51) Int. Cl.
*G01C 21/00* (2006.01)
*G01C 21/32* (2006.01)
(Continued)

(52) U.S. Cl.
CPC ............ *G01C 21/32* (2013.01); *G06F 16/29* (2019.01); *G06N 7/005* (2013.01); *G06N 20/00* (2019.01); *G06N 5/003* (2013.01)

(58) Field of Classification Search
CPC .......... G01C 21/32; G06N 20/00; G06F 16/29
See application file for complete search history.

(56) References Cited

U.S. PATENT DOCUMENTS 7,933,797 B2 * 4/2011 Sorensen ............ G06Q 10/063
705/7.11
8,340,360 B2 12/2012 Chen et al.
(Continued)

FOREIGN PATENT DOCUMENTS

CN 101383090 A 3/2009
CN 104236566 A 12/2014

OTHER PUBLICATIONS

Quddus et al., "A Fuzzy Logic Based Map Matching Algorithm for Road Transport", Journal of Intelligent Transportation Systems; Technology, Planning, and Operations, vol. 10, 2006—Issue 3, 37 pages.

(Continued)

*Primary Examiner* — Adam M Alharbi
(74) *Attorney, Agent, or Firm* — Ditthavong & Steiner, P.C.

(57) ABSTRACT

An approach is provided for point-based map matchers using machine learning. The approach involves retrieving points collected within proximity to a map feature represented by a link of a geographic database. The probe points are collected from sensors of devices traveling near the map feature. The approach also involves determining a probe feature set for each probe point comprising probe attribute values, and determining a link feature set for the link comprising link attribute values. The apparatus further involves classifying, using a machine learning classifier, each probe point to determine a matching probability based on the probe feature set and the link feature to indicate a probability that each probe point is classified as map-matched to the link. The machine learning classifier is trained using ground truth data comprising reference probe points with known map-matches to respective reference (Continued)

links, and comprising known probe attribute values and known link attribute values.

20 Claims, 16 Drawing Sheets

(51) Int. Cl.
*G06N 7/00* (2006.01)
*G06N 20/00* (2019.01)
*G06F 16/29* (2019.01)
*G06N 5/00* (2006.01)

(56) References Cited

U.S. PATENT DOCUMENTS

| | | | |
|---|---|---|---|
| 9,558,660 B1* | 1/2017 | Fowe | G08G 1/0112 |
| 9,778,061 B2 | 10/2017 | Averbuch | |
| 9,816,823 B2 | 11/2017 | Wang et al. | |
| 9,965,950 B2* | 5/2018 | Xu | G08G 1/0133 |
| 2009/0228204 A1 | 9/2009 | Zavoli et al. | |
| 2014/0114563 A1 | 4/2014 | Newson et al. | |
| 2016/0239983 A1 | 8/2016 | Dorum et al. | |
| 2016/0275667 A1 | 9/2016 | Modica et al. | |

OTHER PUBLICATIONS

Wang et al., abstract of "A Point Based Map Matching Algorithm", Journal of Northeastern University, Apr. 1999, 3 pages.

Hashemi et al., "A Machine Learning Approach to Improve the Accuracy of GPS-Based Map-matching Algorithms", 2016 IEEE 17th International Conference on Information Reuse and Integration, Dec. 19, 2016, pp. 77-86.

Yang, "Labeling Spatial Trajectories in Road Network Using Probabilistic Graphical Models", Nov. 2015, 113 pages.

Li et al., "Map Matching for Taxi GPS Data with Extreme Learning Machine", International Conference on Advanced Data Mining and Applications, ADMA, 2014, pp. 447-460.

Hunter et al., "The Path Inference Filter: Model-based Low-latency Map Matching of Probe Vehicle Data", IEEE Transactions on Intelligent Transportation Systems, vol. 15, No. 2, Apr. 2014, retrieved on Mar. 14, 2017 from http://bayen.eecs.berkeley.edu/sites/default/files/journals/The_Path_Inference_Filter.pdf, pp. 507-529.

Notification of Transmittal of the International Search Report and the Written Opinion of the International Searching Authority, or the Declaration; International Search Report and Written Opinion of the International Searching Authority for corresponding International Application No. PCT/US2018/032110, dated Aug. 1, 2018, 15 pages.

* cited by examiner

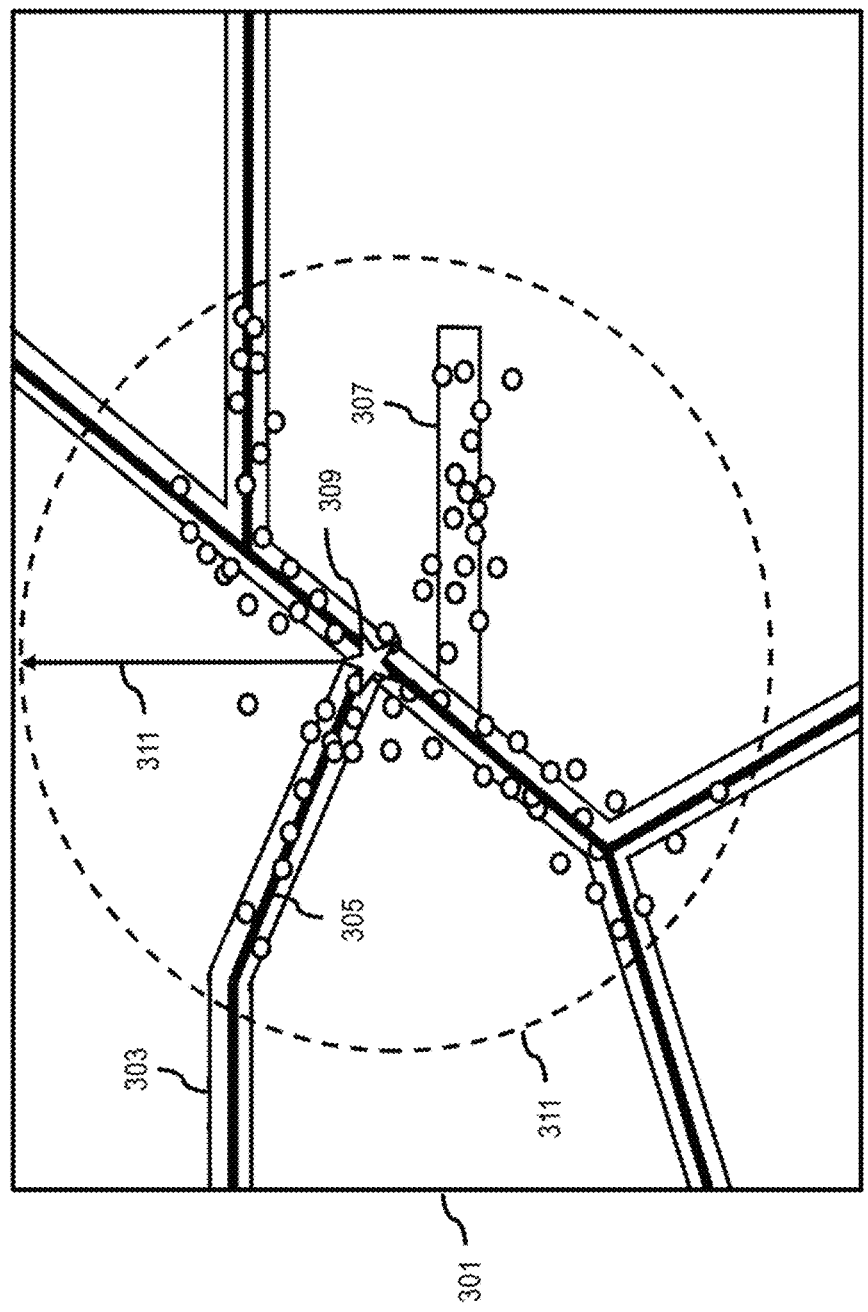

FIG. 9

PROBE-POINT MAP-MATCHING RESULTS

| PROBE POINT ID | CALCULATED MATCH PROBABILITIES | | | MATCHED/ UNMATCHED |
|---|---|---|---|---|
| Probe Point 1 | 0.85 – Link 1 | 0.34 – Link 2 | | Matched |
| Probe Point 2 | 0.70 – Link 1 | 0.20 – Link 3 | 0.10 – Link | Matched |
| Probe Point 3 | 0.20 – Link 2 | | | Unmatched |
| Probe Point 4 | 0.80 – Link 3 | 0.40 – Link 2 | | Matched |
| Probe Point 5 | 0.66 – Link 2 | | | Matched |

METHOD AND APPARATUS FOR PROVIDING A MACHINE LEARNING APPROACH FOR A POINT-BASED MAP MATCHER

RELATED APPLICATION

This application is a continuation of U.S. patent application Ser. No. 15/597,999, filed May 17, 2017, entitled "METHOD AND APPARATUS FOR PROVIDING A MACHINE LEARNING APPROACH FOR A POINT-BASED MAP MATCHER," which is incorporated herein by reference in its entirety.

BACKGROUND

Because of continuous changes to the geometry and configuration of road and other transportation networks, mapping-related service providers (e.g., map data providers, navigation service providers, etc.) face significant technical challenges to creating and maintaining up-to-date map data. One area of development has been related to generating, updating, and/or analyzing map data through use of raw location data such as probe points collected by devices and/or vehicles equipped with sensors to report location, heading, speed, time, etc. as they travel. As part of this process, map-matchers (e.g., point-based map-matchers) are used to process the probe points to identify the correct road or path on which a probe device or vehicle is traveling, and to determine the device's location on that road or path. However, current map-matchers can often encounter issues of accuracy, scalability, and/or efficiency, particularly when processing high volumes of probe points and/or when processing probe points in real-time, particularly when these current map-matchers rely on empirical heuristics or generic assumptions that may or may not apply to the probe points being evaluated.

SOME EXAMPLE EMBODIMENTS

Therefore, there is a need for a machine learning approach for point-based map matchers that, for instance, can be used for map data analysis, map data creation, map data update, and/or localization of device/vehicle.

According to one embodiment, a computer-implemented method for map-matching probe data using a machine learning classifier comprises retrieving one or more probe points collected within a proximity to a map feature represented by a link of a geographic database. The one or more probe points are collected from one or more sensors of a plurality of devices traveling within the proximity to the map feature. The method also comprises determining a probe feature set for each of the one or more probe points. The probe feature set comprises respective values for one or more probe attributes of said each probe point. The method further comprises determining a link feature set for the link. The link feature set comprises respective values for one or more link attributes of the link. The method further comprises classifying, using the machine learning classifier, said each probe point to determine a matching probability based on the probe feature set and the link feature. The matching probability indicates a probability that said each probe point is classified as map-matched to the link. The machine learning classifier is trained using ground truth data comprising reference probe points with known map-matches to respective reference links, and comprising known values of the one or more probe attributes for the reference probe points and known values of the one or more link attributes for the reference links.

According to another embodiment, an apparatus for map-matching probe data using a machine learning classifier comprises at least one processor, and at least one memory including computer program code for one or more computer programs, the at least one memory and the computer program code configured to, with the at least one processor, cause, at least in part, the apparatus to retrieve one or more probe points collected within a proximity to a map feature represented by a link of a geographic database. The one or more probe points are collected from one or more sensors of a plurality of devices traveling within the proximity to the map feature. The apparatus is also caused to determine a probe feature set for each of the one or more probe points. The probe feature set comprises respective values for one or more probe attributes of said each probe point. The apparatus is further caused to determine a link feature set for the link. The link feature set comprises respective values for one or more link attributes of the link. The apparatus is further caused to classify, using the machine learning classifier, said each probe point to determine a matching probability based on the probe feature set and the link feature. The matching probability indicates a probability that said each probe point is classified as map-matched to the link. The machine learning classifier is trained using ground truth data comprising reference probe points with known map-matches to respective reference links, and comprising known values of the one or more probe attributes for the reference probe points and known values of the one or more link attributes for the reference links.

According to another embodiment, a computer-readable storage medium for map-matching probe data using a machine learning classifier carries one or more sequences of one or more instructions which, when executed by one or more processors, cause, at least in part, an apparatus to retrieve one or more probe points collected within a proximity to a map feature represented by a link of a geographic database. The one or more probe points are collected from one or more sensors of a plurality of devices traveling within the proximity to the map feature. The apparatus is also caused to determine a probe feature set for each of the one or more probe points. The probe feature set comprises respective values for one or more probe attributes of said each probe point. The apparatus is further caused to determine a link feature set for the link. The link feature set comprises respective values for one or more link attributes of the link. The apparatus is further caused to classify, using the machine learning classifier, said each probe point to determine a matching probability based on the probe feature set and the link feature. The matching probability indicates a probability that said each probe point is classified as map-matched to the link. The machine learning classifier is trained using ground truth data comprising reference probe points with known map-matches to respective reference links, and comprising known values of the one or more probe attributes for the reference probe points and known values of the one or more link attributes for the reference links.

According to another embodiment, an apparatus for map-matching probe data using a machine learning classifier comprises means for retrieving one or more probe points collected within a proximity to a map feature represented by a link of a geographic database. The one or more probe points are collected from one or more sensors of a plurality of devices traveling within the proximity to the map feature.

The apparatus also comprises means for determining a probe feature set for each of the one or more probe points. The probe feature set comprises respective values for one or more probe attributes of said each probe point. The apparatus further comprises means for determining a link feature set for the link. The link feature set comprises respective values for one or more link attributes of the link. The apparatus further comprises means for classifying, using the machine learning classifier, said each probe point to determine a matching probability based on the probe feature set and the link feature. The matching probability indicates a probability that said each probe point is classified as map-matched to the link. The machine learning classifier is trained using ground truth data comprising reference probe points with known map-matches to respective reference links, and comprising known values of the one or more probe attributes for the reference probe points and known values of the one or more link attributes for the reference links.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A to 3D are diagrams illustrating an example of map-matching probe points using a trained machine learning classifier, according to one embodiment;

FIG. 9 is a diagram illustrating an example user interface displaying results of a machine learning approach to point-based map-matching, according to one embodiment;

DESCRIPTION OF SOME EMBODIMENTS

Examples of a method, apparatus, and computer program for providing a machine learning approach to point-based map matching are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
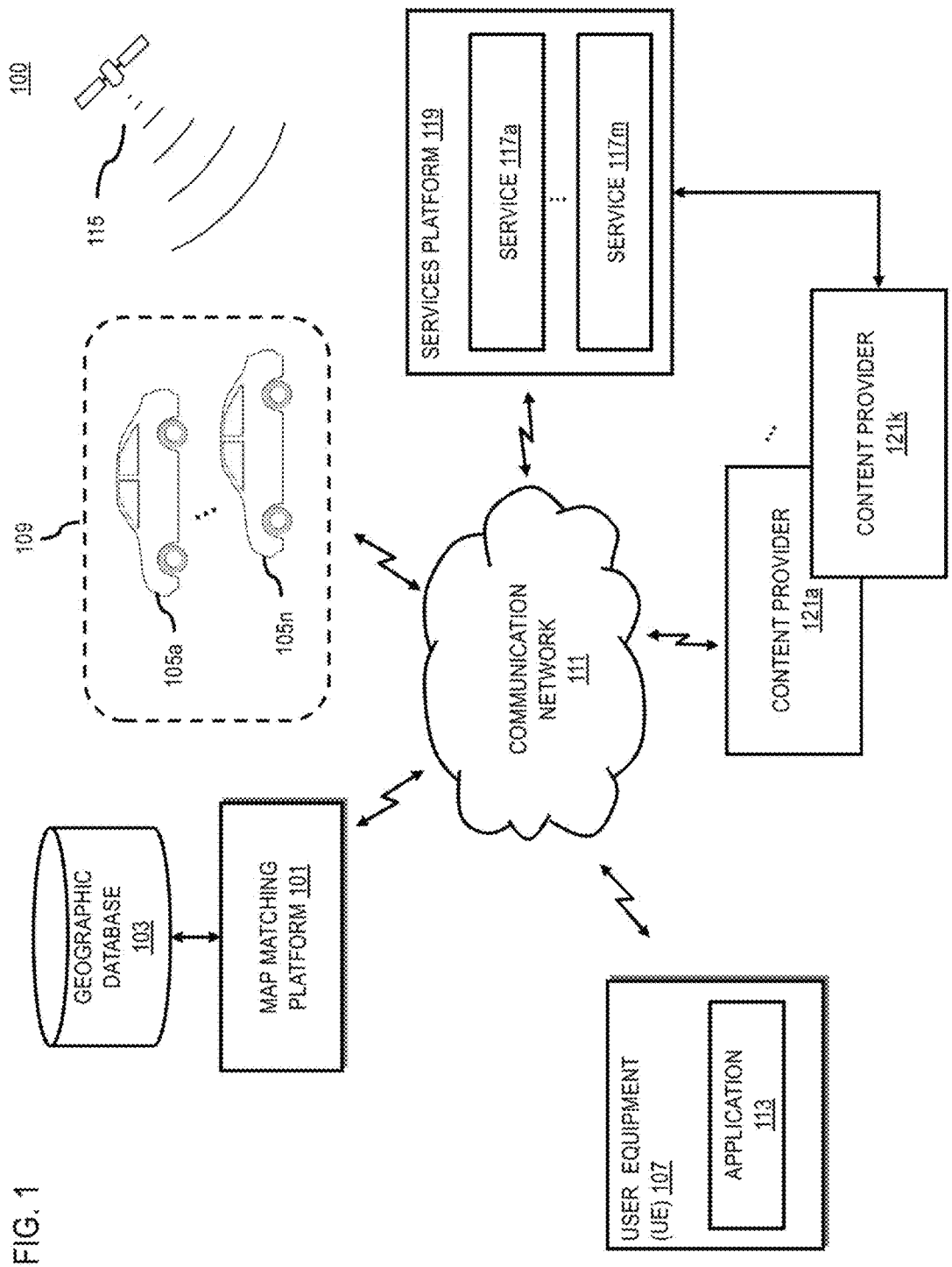
FIG. 1 is a diagram of a system capable of providing a machine learning approach to point-based map matching, according to one embodiment.

FIG. 1 is a diagram of a system capable of providing a machine learning approach to point-based map matching, according to one embodiment. In recent years, location sensor data (e.g., Global Positioning Satellite (GPS) data or other satellite-based location data) are used as a widely available and fresh resource in the map making industry to identify map attributes such as new geometries and changes to existing features (e.g., changes in direction of travel, speed limit, etc. of a road or link). As discussed above, as part of the processing of this raw location data (e.g., comprising probe points of GPS or other location data), map matchers are used to identify the correct road, path, link, etc. on which a device that collected the location data is travelling, and to determine the device location on that road segment, path, link, etc. For example, map-matchers are used for many large scale location based applications and traffic management services, such as vehicle navigation, traffic and incident reporting, etc.

Although map matchers have been used widely, the map matching problem is still a challenge for the map making industry for at least the following reasons: (1) map matching unsorted GPS or probe points in bulk from different devices can expensive; (2) generally most map matchers assume the map data against which probe points are matched are correct; and this assumption may not be valid in the context of detecting map changes; (3) existing point-based map matchers use empirical data to set parameters in assumed probability distributions that might be incorrect or that do not model the data accurately; and (4) current map matchers generally do not output an easy-to-interpret matching probability or confidence score, which can be difficult to define.

Generally, there are two types of map matchers: (1) point-based map matchers, and (2) trajectory-based map matchers. For example, a point-based map matchers (also known as a real-time map matcher) takes an individual GPS or probe point to match to the road segment or link based on, for instance, a maximum likelihood. On the other hand, a trajectory-based map matcher (also known as post-process map matcher) can produce more accurate results by taking more information in the form of a sequence of GPS or probe points (e.g., instead of a single probe point) and using more complicated approach to map match the trajectory to a road segment. However, trajectory-based map matchers typically cannot operate in real time because they require a sequence of probe points to be captured over a period of time to create a trajectory for matching. Compared with a trajectory-based map matcher, a point-based map matcher is fast, easy to implement and does not need a large amount of memory. Therefore, point-based map matchers are more advantageous than trajectory-based map matchers for bulk data processing and/or real time applications.

In the area of point-based map matcher, complicated equations traditionally were developed to combine various error sources associated with positioning data and digital roads map and discussed them in terms of the matching probability. Because the focus of these traditional point-based map matchers is on measurement error, most of them ignore the fact that other probe attributes or features (e.g., speed), and/or link attributes (e.g., road density, complexity, etc.) can affect the accuracy map matching. Another drawback is that the equations and/or their parameters used for map matching, and the classification threshold used is usually set based on empirical study with respect to a specific region. Although the logic is easy to implement, on the global scale, the model for this traditional approach needs to be recalibrated when applying on a different region.

To address this problem, a system 100 of FIG. 1 introduces the capability to apply machine learning to the point-based map matching problem based on attributes or features of each probe point, and attributes or features of the links to which the probe points are map matched to generate a matching probability or score. More specifically, in one embodiment, the system 100 provides a framework to obtain ground truth data to train and evaluate supervised learning algorithms that a point-based map matcher (e.g., a map matching platform 101) can use to more accurately approach the point-based map matching problem. In one embodiment, the map matching platform 101 incorporates a supervised learning model (e.g., a logistic regression model, Random-Forest model, and/or any equivalent model) to provide matching probabilities that are learned from the ground truth data.

In yet another embodiment, the map matching platform 101 can be implemented into a map production pipeline to identify new geometries or changes to existing geometries (e.g., geometries represented and stored in a geographic database 103). For example, such new geometries or changes can be identified by thresholding the matching probabilities that the supervised learning model predicts into buckets of matched and unmatched probe points. The unmatched probe points can then be processed in the pipeline to determine new or changed geometries.

In another embodiment, the machine learning map-matcher of the map matching platform 101 can be used for locating vehicles 105a-105n (also collectively referred to as vehicles 105; e.g., autonomous vehicles, highly autonomous vehicles, etc.) as they travel in a transportation or road network. For example, the vehicles 105 can interact with the map matching platform 101 to use machine learning map-matchers according to the various embodiments described herein to locate themselves precisely on the road (e.g., within a particular lane). In this embodiment, the map matching platform 101 would use as feature vector attributes from the car with respect to the road network to perform point-based matching. By way of example, the feature include, but are not limited to distance to stop signs, traffic lights, other cars, and/or any other map feature. Based on the feature vector attributes, the map matching platform 101 can output the probability of the location of the car being in one or more lanes of the road on which the car is driving. The car then be map-matched to the lane with the highest probability as determined by the machine learning map-matcher.

In one embodiment, the system 100 includes ground truth data collection framework that includes a probe device or vehicle (e.g., one or more vehicles 105a-105n, also collectively referred to as vehicles 105, and/or location-capable user equipment (UE) 107) that can travel within a road or transportation network 109. In one embodiment, the vehicles 105 and/or UE 107 is equipped with one or more sensors for collecting probe point data (e.g., position, heading, speed, time, etc.) as it travels in the transportation network 109. In addition, the vehicles 105 and/or UE 107 can is capable of noting or recording true data (e.g., true position, true heading, true speed, etc.) at the same time as the probe point data is collected. In some embodiments, the probe device or vehicle can also mark off-road locations (e.g., parking lots, office buildings, recreation paths, points of interest, event venues, etc.).

In other words, each ground truth collection device or vehicle (e.g., the vehicles 105 and/or UE 107) includes a typical location sensor (e.g., a GPS sensor) that is used to normally generate probe point data, and another means to match the probe point data gathered using the typical location sensor to a corresponding "true" value or data, which is considered by the system 100 to represent the probe device's actual location on a road segment or link. In one embodiment, the ground truth collection device or vehicle can be equipped with both high precision location sensors (e.g., inertial measurement units (IMUs), high-precision GPS sensors, etc.) that can achieve higher accuracy than the typical location sensor (e.g., consumer grade GPS or other location sensor in a portable device), and typical locations sensors. In this way, the high precision sensors can be used to reference the link or road segment on which the ground truth collection vehicle is traveling on to generate a reference location data set, and the typical or test location sensor can be used to generate a set of probe point data that is time-matched against the reference location set. In one embodiment, this data set represents the ground truth data for training a machine learning classifier of a point-based map matcher (e.g., the map matching platform 101). In one embodiment, different typical or test sensors (e.g., different types of location sensors, different vendors of the location sensors, etc.) can be used to generate different sets of ground truth data. In this way, features or attributes of the collecting location sensor can be used an additional attributes of the probe point for machine learning.

Figure 2:
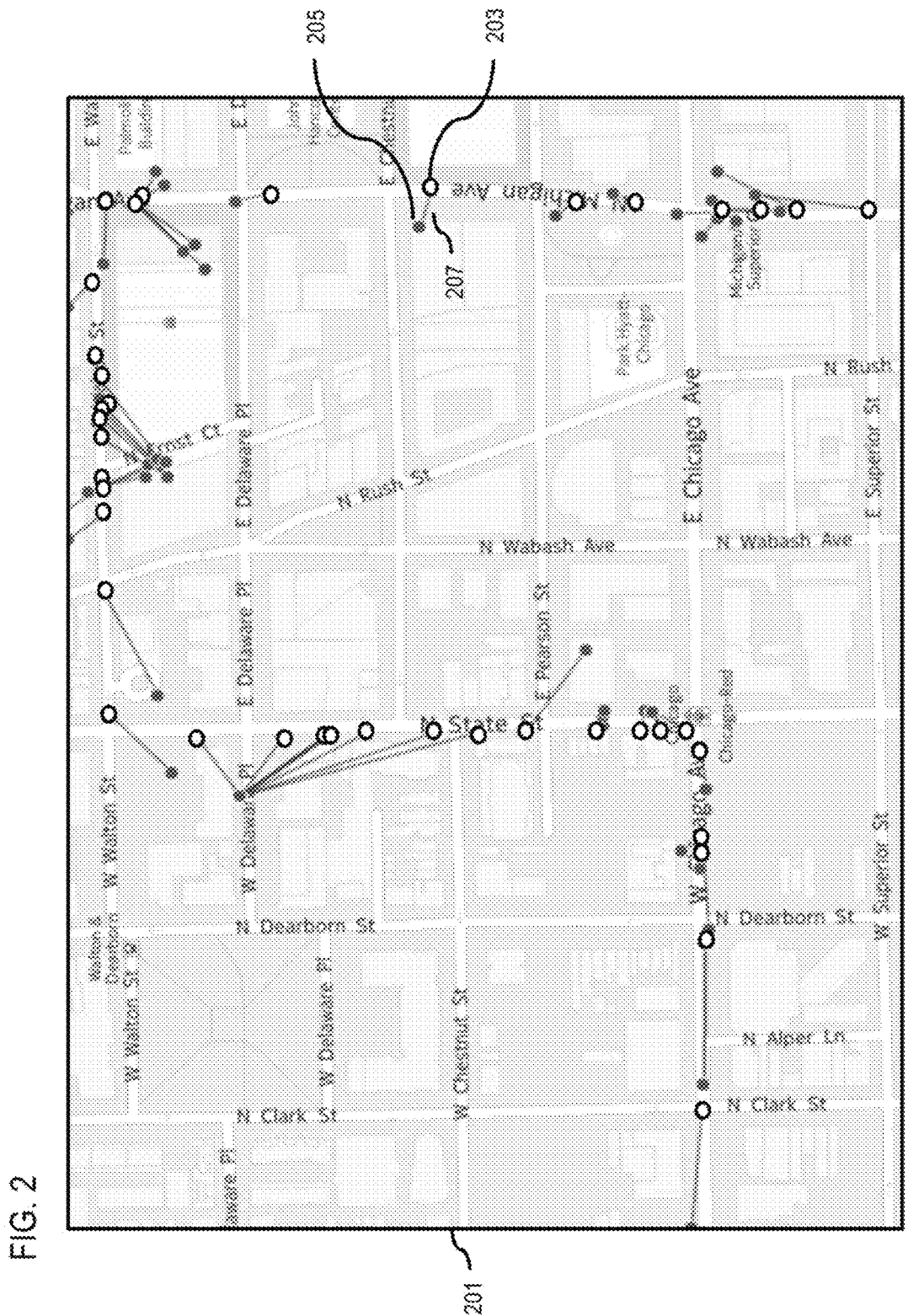
FIG. 2 is a diagram illustrating an example process for gathering ground truth sensor data for providing a machine learning approach to point-based map matching, according to one embodiment.

An example of ground truth data collected according the various embodiments described herein is discussed with respect to FIG. 2. FIG. 2 is a diagram illustrating an example process for gathering ground truth sensor data for providing a machine learning approach to point-based map matching, according to one embodiment. In this example, a ground truth collection vehicle 105 carries a mobile device equipped with a test location sensor (e.g., a GPS sensor), as well a high precision IMU/GPS to generate high precision location data. As shown, a map 201 of FIG. 2 depicts each data point of the high precision location data set as a white dot (e.g., high precision data point 203) and each of the lower precision test probe points generated by the test location sensor as a black dot (e.g., probe point 205). The line 207 connecting the high precision data point 203 and the probe point 205 indicates that the two data points are correlated in time (e.g., collected at the same or substantially the same time by each respective sensor). In this example, the high precision data points (e.g., white dots) track closely with the known contours of the roadway. In contrast, the test probe points varies depending on the accuracy of the test location sensor in light of the surroundings. The difference between the two data illustrates the problem of point-based map matching. In one embodiment, the route selected to generate the ground truth can be selected to traverse map features (e.g., intersections with nearby high buildings, highway interchanges, etc.) that are expected to have varied effects on probe point accuracy or variance of a sensed location to an actual location from a link or road segment.

In one embodiment, after obtaining the ground truth data set (e.g., using the process described above or some other equivalent process), the system 100 continues with the ground truth generation process by extracting features from the test probe point dataset, the high precision data points, and information on the road segments or links traveled. By way of example, probe points that specify location from GPS or other satellite-based sensors usually are reported with at least a timestamp, latitude, longitude, and heading. In some embodiments, the probe points can have additional information such as vendor, sensor type, altitude, precision, dilution of precision (DOP), etc. In one embodiment, the system 100 can use any reported attribute or parameter associated with the test probe points. Accordingly, the example of probe features or attributes discussed above are provided by way of illustration and not limitation.

In one embodiment, with respect to the information about the road segment, path, or link, the system 100 can determine any attribute including, but not limited, to a geometry, function class, speed limit, direction of travel, as well as Boolean values indicating whether the link or road segment is part of a double-digit road (e.g., divided roadway), ramp, intersection internal, navigability, etc. In one embodiment, the system 100 can query the link attributes from the geographic database 103 or other similar data source.

In one embodiment, the system 100 groups possible features or attributes of the probe points and/or links or interest into three categories: (1) both link and probe attributes (e.g., combined attributes resulting from features of both the probe points and links); (2) probe attributes; and (3) link attributes. By way of example, the combined attributes for the link and probe attributes include, but are not limited: (1) a distance attribute—e.g., perpendicular distance between GPS point and link segment; (2) a heading discrepancy attribute—e.g., the angle difference between a sensed probe point heading and a bearing of the link segment to which the probe point is to be matched; and (3) a speed ratio—probe speed/median speed of the link.

In one embodiment, the probe attributes include, but are not limited to: speed, heading, position (e.g., latitude, longitude, and/or altitude), sensor type (e.g., GPS sensor, cellular triangulation, WiFi-based positioning, etc.), sensor vendor (e.g., sensor manufacturer), and/or the like.

In one embodiment, as discussed in part above, the link attributes include, but are not limited to: function class (e.g., range from 1-5), ramp (e.g., Boolean—Y/N), multi-digit (e.g., Boolean—Y/N), intersection internal (e.g., Boolean—Y/N), urban/suburban, region (e.g., North America, Europe, etc.), navigable (e.g., Boolean—Y/N), etc.

In addition, in one embodiment, the system 100 can calculate link attributes that are derived from neighboring links or road segments that fall with a circular radius (CR) from a reference point on the link (e.g., a vertex of a polyline (PL) representing a contour of the road segment or path represented by the link). By way of example, given a link j, the reference point of the link can be designated as Link (vertex,PL) j or denoted in abbreviated format as Link j. With respect to this nomenclature, in one embodiment, the following additional attributes can be calculated:

(1) link density=sum (all link segments length within CR)/(pi*CR^2);

(2) link closeness: min (Hausdorff distance(j,k)) where j=candidate link, and k=all the other links that are (a) within the CR, and (b) not directly connected to link j;

(3) link closeness to non-navigable links: min (Hausdorff distance(j,kn) where j=candidate link, and k=all the non-navigable links within the CR (e.g., determined from a spatial index of the non-navigable links);

(4) link bearing discrepancy: standard deviation(all link segments bearing within CR compared to a heading of the probe point);

(5) link neighborhood attribute: average(absolute_difference(link_attributes(j,1))) wherein j=candidate link, and l=all the other links that are (a) within the CR, and (b) directly connect to link j, and wherein link_attributes could be any ordinal attributes (e.g., speed category, function class, etc.); and (6) nearby cartographic topology: is there any carto close to link j (e.g., Boolean—Y/N) where closeness is defined with respect to a parameter R, and cartographic topology refers to non-road or non-link map features (e.g., parking lot, building, etc.), and, for instance, can be queried from a map layer of the geographic database 103 or other similar mapping database. In an embodiment of localizing autonomous or other vehicles, nearby cartographic topology can also include distance to localized objects in a High Definition Map (HD Map) that record the locations of the localized objects with a high degree of accuracy and precision. For instance, the closeness to nearby topology can include a distance from the position of the car to a stop sign, pole-like objects (e.g., telephone poles), or other similar objects represented in the HD Map. As another example, if the car (e.g., autonomous car) is using LIDAR, closeness to nearby topology can include sampled distance to other observed co-located cars (e.g., as determined from an intensity of the LIDAR points).

In one embodiment, the system 100 can select all or a subset of the probe and link attributes available to the system 100 (e.g., including but not limited to the attributes/features discussed above) when implementing the machine learning classifier of, for instance, the map matching platform 107. For example, the system 100 can balance the number and/or selection of which attributes to include in an implementation based on a desired level of performance (e.g., number of probe points to process per time period), accuracy, or the like. For example, depending on available computational resources (e.g., processing resources, memory resources, bandwidth, etc.) and a performance target (e.g., capability to process millions of probe points per second), the system 100 can include fewer or more attributes.

In one embodiment, after feature selection and generation from ground truth data, the system 100 can initiate training of a machine language classifier to make point-based map-matching predictions. By way of example, the system 100 (e.g., the map matching platform 101) can use any machine classifier that includes, at least, a model (e.g., a set of equations, rules, decision trees, etc.) that include a set of parameters to manipulate an input feature set to make a prediction (e.g., the matching probability that a probe point is map matched to a given link). During training, the map matching platform 101 uses a learner module that feeds features sets from probe points in the ground truth data into the model to compute a predicted matching probability to a given link or road segment using an initial set of model parameters. The learner module then compares the predicted matching probability and identified link to the ground truth map-matching resulting for each probe point used for training. The learner module then computes an accuracy of the predictions for the initial set of model parameters. If the accuracy or level of performance does not meet a threshold or configured level, the learner module incrementally adjusts the model parameters and until the model generates predictions at a desired or configured level of accuracy with respect to the ground truth training data. In other words, a "trained" machine language classifier is a classifier with model parameters adjusted to make accurate predictions with respect to the training data set or ground truth data.

In one embodiment, the map matcher classifier of the map matching platform 101 reports the matching score (or matching probability) instead of the class label (e.g., matched or unmatched). This probability gives, for instance, some kind of confidence on the prediction. However, in one embodiment, because the map matching platform 101 can use any type of machine learning classifier or model (e.g., logistic regression, RandomForest, neural network, etc.) and because not all classifiers provide well-calibrated probabilities, the map matching platform 107 may perform a separate calibration step to calibrate the probabilities. This calibration step can be a post-processing depending on the classifier chosen. For example, logistic regression returns well calibrated predictions by default as it directly optimizes log-loss. However, RandomForest classifiers tend to average predictions which have difficulty making predictions near 0 and 1. In one embodiment, calibration methods such as Brier's score or equivalent process can be applied to obtain well calibrated probability prediction as confidence scores.

Figure 3B:
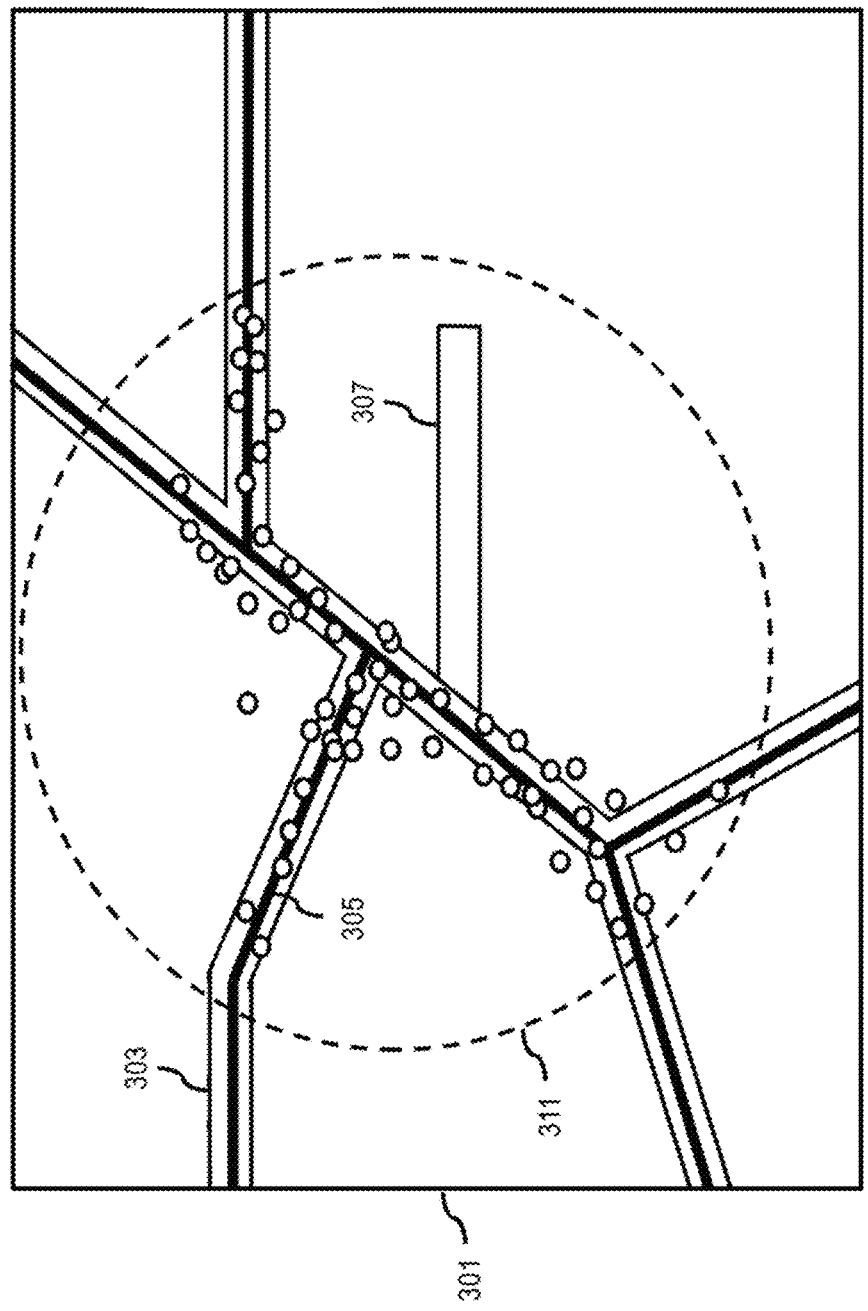

In one embodiment, the system 100 can then use the trained map matching platform 101 to classify probe points for map matching using a machine learning approach according to the embodiments described herein. FIGS. 3A to 3D are diagrams illustrating an example of map-matching probe points using a trained machine learning classifier, according to one embodiment. FIG. 3A illustrates map 301 of a geographic area depicting a road network 303 shown in outline shape with mapped geometries (e.g., mapped links 305) of the road network 303 indicated with a polyline (e.g., indicated as dark lines) superimposed on the mapped portion of the road network 303. Mapped links 305, for instance, refer to segments of the road network 303 that have corresponding link or road segment records stored in a map database (e.g., the geographic database 103). Conversely, as shown, an unmapped road segment 307 is displayed only in outline with no superimposed polyline to indicate that there is no corresponding link record for this this road segment 307.

In one embodiment according to the example of FIG. 3A, the map matching platform 101 performs point-based map matching for a given area of a map using a stepwise approach using vertices of links or road segments as reference points. For example, the map matching platform 101 selects a vertex 309 of a mapped link 305 to begin its classification. The map matching platform 101 extends a circular radius (CR) 311 from the vertex 309 to define a circular area 313 by sweeping the CR 311 around the vertex 309. In one embodiment, e.g., when operating in a bulk-processing mode, the map matching platform 101 then retrieves all collected probe points that fall within the geographic area defined by the circular area 313. Each probe point meeting this spatial criterion is shown as a white circular dot in FIG. 3A.

After retrieving the probe points, the map matching platform 101 then extracts a feature set for each candidate pair of probe point and link within the circular area 313. In one embodiment, the feature set comprises extracted feature values for the selected set of probe/link attributes that were used to train the classifier of the map matching platform 101 (e.g., one or more of the features/attributes described above). The map matching platform 101 the processes the feature set for each candidate probe point/link pair using the trained classifier to determine a matching probability. See the processes of FIGS. 6-8 below for additional details of the feature extraction and classification according to the various embodiments described herein.

Figure 3C:
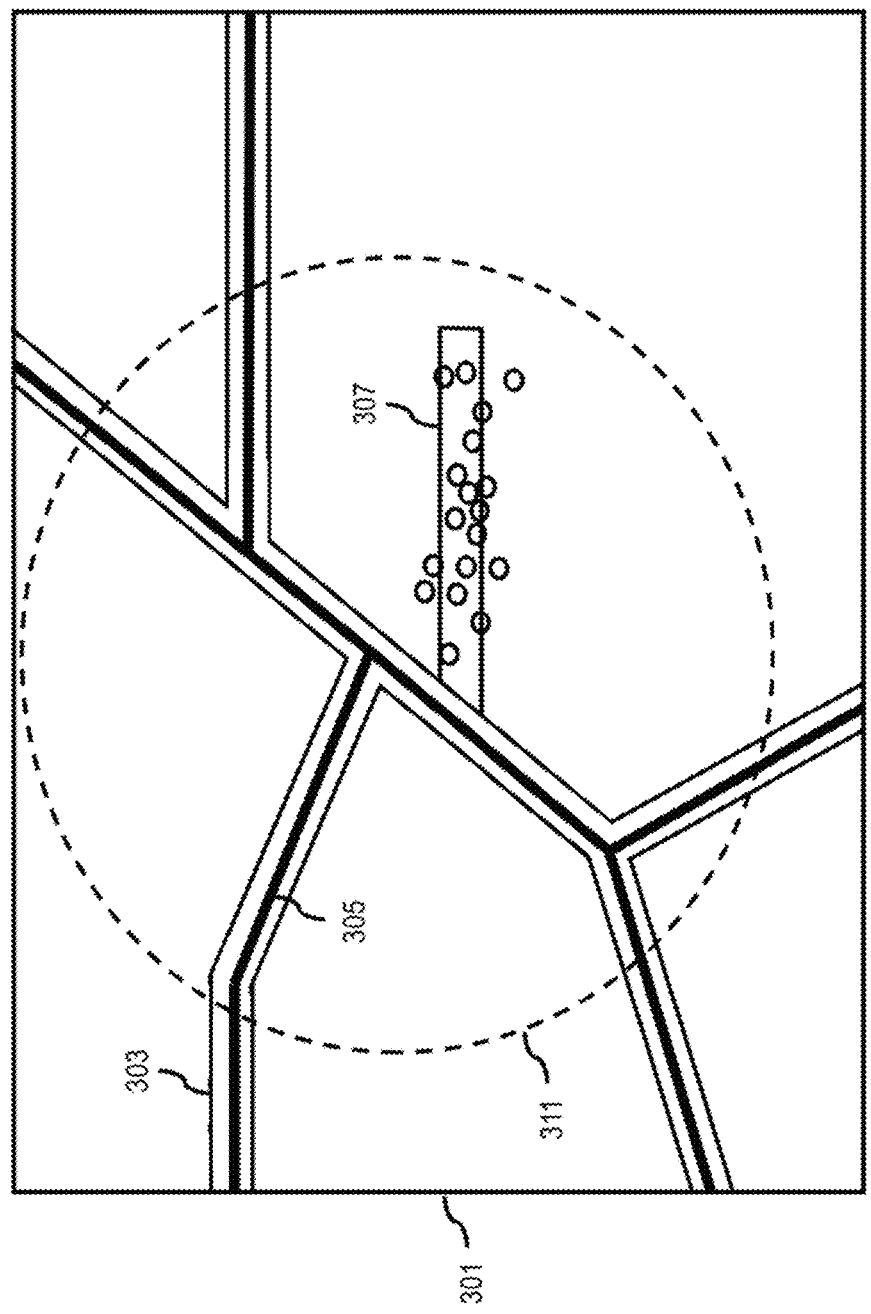

As shown in FIGS. 3B and 3C, the map matching platform 101 can then apply a thresholding criterion (e.g., matching probability>threshold probability) to categorize the probe points into either matched or unmatched buckets. FIG. 3B illustrates the probe points of FIG. 3A that are classified as being map matched to a known or mapped link of the road network 303. Accordingly, as shown, the probe points of FIG. 3B are clustered or near many of the mapped links (e.g., mapped link 305) of the road network 303. Because each possible candidate probe point/link combination is analyzed in one embodiment, it is possible for a single probe point to have matching probabilities for multiple links. In this case, the map matching platform 101 can match the probe point to the link with the highest matching probability.

FIG. 3C illustrates the probe points of FIG. 3A that are classified as being unmatched to any known link or geometry of the road network 303 (e.g., unknown or unmatched with respect to the information stored in the geographic database 103). In this example, the unmatched probe points are predominantly near the unmapped road segment 307 because they most likely are originate from travel along this previously unmapped segment 307.

Figure 3D:
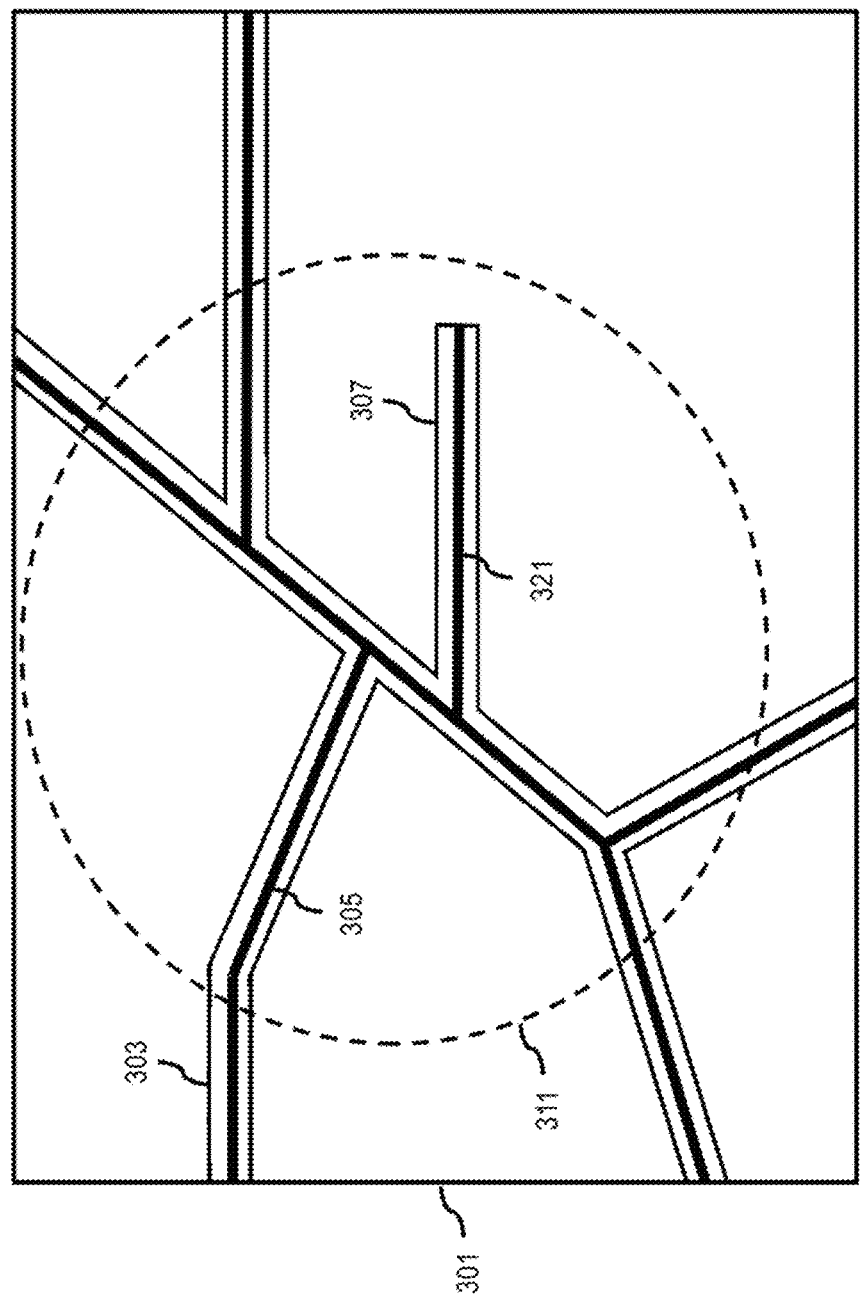

In one embodiment, the unmatched probe points may be indicative of new or changes in the geometry of the road network 303. Accordingly, the map matching platform 101 can pass this set of unmatched probe points to another component of a map data generation pipeline to determine whether they indicate a new road segment that should be mapped in the geographic database 103 as a new link record. By way of example, the probe points can be processing using any known method for determining a new link including, but not limited to, clustering, trajectory analysis, imagery analysis of the area, dispatch of a mapping vehicles or crews, etc. FIG. 3D shows a result of this process of extracting new road geometries from unmatched probe points. As shown in FIG. 3D, the map 301 has been updated to include a new link record 321 corresponding to the unmapped road segment 307. The new link record 321 is indicated by a dark polyline as used to indicate the other mapped segments of the road network 303.

Returning to FIG. 1, as shown, the system 100 comprises one or more vehicles 105a-105n (also collectively referred to as vehicles 105) and/or one or more user equipment (UE) devices 107 that act as probes traveling over a road network (e.g., the transportation network 109). Although the vehicles 105 are depicted as automobiles, it is contemplated that the vehicles 105 can be any type of transportation vehicle, manned or unmanned (e.g., planes, aerial drone vehicles, motor cycles, boats, bicycles, etc.), and the UE 107 can be associated with any of the types of vehicles or a person or thing (e.g., a pedestrian) traveling within the transportation network 109. In one embodiment, each vehicle 105 and/or UE 107 is assigned a unique probe identifier (probe ID) for use in reporting or transmitting probe data collected by the vehicles 105 and UE 107. The vehicles 105 and UE 107, for instance, are part of a probe-based system for collecting probe data for measuring traffic conditions in a road network. In one embodiment, each vehicle 105 and/or UE 107 is configured to report probe data as probe points, which are individual data records collected at a point in time that records telemetry data for that point in time. The probe points can be reported from the vehicles 105 and/or UEs 107 in real-time, in batches, continuously, or at any other frequency requested by the system 100 over, for instance, the communication network 111 for processing by the map matching platform 101.

In one embodiment, a probe point can include attributes such as: probe ID, longitude, latitude, speed, and/or time. The list of attributes is provided by way of illustration and not limitation. Accordingly, it is contemplated that any combination of these attributes or other attributes may be recorded as a probe point (e.g., such as those previously discussed above). For example, attributes such as altitude (e.g., for flight capable vehicles or for tracking non-flight vehicles in the altitude domain), tilt, steering angle, wiper activation, etc. can be included and reported for a probe point. In one embodiment, if the probe point data includes altitude information, the transportation network, links, etc. can also be paths through an airspace (e.g., to track aerial drones, planes, other aerial vehicles, etc.), or paths that follow the contours or heights of a road network (e.g., heights of different ramps, bridges, or other overlapping road features).

In one embodiment, the vehicles 105 and/or UE 107 may include sensors for reporting measuring and/or reporting attributes. The attributes can also be any attribute normally collected by an on-board diagnostic (OBD) system of the vehicle, and available through an interface to the OBD system (e.g., OBD II interface or other similar interface).

In one embodiment, the system 100 can build trajectories using probe provider information and/or probe identifier (probe ID) information associated with the probe data. For example, the system 100 builds the trajectories by matching the probe points in the probe data according to probe identifier and sequencing the probe points according to time. In this way, the trajectory can identify the movement path of the respective probe or device within the bounded geographic area over a time range covered by the probe data. Because the trajectories are made of individual probe points, each point in the trajectory also has the properties or attributes recorded for each probe point. Accordingly, in one embodiment, the machine learning approach to point-based map matching can be used to further determine which probe points to include in particular sequence or trajectory. For example, at any given point along the trajectory, a heading, speed, position, etc. of the probe point can be determined for a candidate probe point. Then the existing trajectory to which a probe point might be added can be assumed by the system 100 to be equivalent to a link against which the probe point can be matched. Accordingly, attributes to the trajectory can then extracted to create a candidate probe point and link/trajectory pair for classification by the map matching platform 101.

In one embodiment, system 100 can be extended to path-based map-matchers in addition to the point-based map matchers discussed with respect to the embodiments described herein. For example, the map matching platform 101 can identify a set of candidate road segments that are possible matches for each probe point. In one embodiment, each of these candidate road segments is represented as a hidden state in a Markov chain and has an emission probability, which is the likelihood of observing the probe point (e.g., GPS point) conditional on the candidate segment being the true match. The map matching platform 101 can calculate the transition probability for every pair of adjacent hidden states in the chain such that the probability of the latter is dependent only on the former, hence obeying the Markov assumption. The map matching platform 101 then finds the maximum likelihood over the Markov chain that has the highest joint emission and transmission probabilities. The trained machine learning classifier of the map matching platform 101 can be used to obtain the emission probability.

In one embodiment, the map matching platform 107 performs the processes for point-based map matching of the collected probe points using a machine learning approach as discussed with respect to the various embodiments described herein. By way of example, the mapping platform 107 can be a standalone server or a component of another device with connectivity to the communication network 111. For example, the component can be part of an edge computing network where remote computing devices (not shown) are installed along or within proximity of the transportation network 109 to provide point-based map matching of probe data collected locally or within a local area served by the remote or edge computing device.

In one embodiment, the mapping platform 101 has connectivity or access to a geographic database 103 that includes mapping data about a road network (additional description of the geographic database 103 is provided below with respect to FIG. 4). In one embodiment, the probe data, map matching results, and/or related information can also be stored in the geographic database 103 by the mapping platform 101. In addition or alternatively, the probe data can be stored by another component of the system 100 in the geographic database 103 for subsequent retrieval and processing by the map matching platform 101.

In one embodiment, the vehicles 105 and/or UE 107 may execute an application 113 to present or use the results of point-based map matching generated by the map matching platform 101 according to the embodiments described herein. For example, if the application 113 is a navigation application then the point-based map matching results can be used to determine positioning information, routing information, provide updated estimated times of arrival (ETAs), and the like.

By way of example, the UE 1073 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with a vehicle 105 (e.g., cars), a component part of the vehicle 105, a mobile device (e.g., phone), and/or a combination of thereof. Similarly, the vehicle 105 may include computing components that can perform all or a portion of the functions of the UE 107.

By way of example, the application 113 may be any type of application that is executable at the vehicle 105 and/or the UE 107, such as mapping applications, location-based service applications, navigation applications, content provisioning services, camera/imaging application, media player applications, social networking applications, calendar applications, and the like. In one embodiment, the application 113 may act as a client for the map matching platform 101 and perform one or more functions of the map matching platform 101 alone or in combination with the platform 101.

In one embodiment, the vehicles 105 and/or the UE 107 are configured with various sensors for generating probe data. By way of example, the sensors may include a global positioning sensor for gathering location data (e.g., GPS), Light Detection And Ranging (LIDAR) for gathering distance data and/or generating depth maps, infrared sensors for thermal imagery, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture obstruction for analysis and documentation purposes), an audio recorder for gathering audio data, velocity sensors mounted on steering wheels of the vehicles, switch sensors for determining whether one or more vehicle switches are engaged, and the like.

In another embodiment, the sensors of the vehicles 105 and/or UE 107 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof In one scenario, the sensors may detect weather data, traffic information, or a combination thereof. In one example embodiment, the vehicles 105 and/or UE 107 may include GPS receivers to obtain geographic coordinates from satellites 115 for determining current location and time associated with the vehicle 105 and/or UE 107 for generating probe data. Further, the location can be determined by a triangulation system such as A-GPS, Cell of Origin, or other location extrapolation technologies.

The communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the map matching platform 101 may be a platform with multiple interconnected components. The map matching platform 101 may include multiple servers, intelligent networking devices, computing devices, components and corresponding software for providing trajectory bundles for map data analysis. In addition, it is noted that the mapping platform 107 may be a separate entity of the system 100, a part of one or more services 117a-117m (collectively referred to as services 117) of the services platform 117, or included within the UE 107 (e.g., as part of the applications 113).

The services platform 119 may include any type of service 117. By way of example, the services 117 may include mapping services, navigation services, travel planning services, notification services, social networking services, content (e.g., audio, video, images, etc.) provisioning services, application services, storage services, contextual information determination services, location based services, information based services(e.g., weather, news, etc.), etc. In one embodiment, the services platform 119 may interact with the map matching platform 101, the vehicle 105, the UE 107, and/or one or more content providers 121a-121k (also collectively referred to as content providers 121) to provide the services 117.

In one embodiment, the content providers 121 may provide content or data to the vehicles 105 and/or UEs 107, the map matching platform 101, and/or the services 117. The content provided may be any type of content, such as mapping content, textual content, audio content, video content, image content, etc. In one embodiment, the content providers 121 may provide content that may aid in the point-based map matching using a machine learning approach according to the various embodiments described herein. In one embodiment, the content providers 121 may also store content associated with the vehicles 105, the UE 107, the map matching platform 101, and/or the services 117. In another embodiment, the content providers 121 may manage access to a central repository of data, and offer a consistent, standard interface to data, such as a repository of probe data, probe features/attributes, link features/attributes, etc. Any known or still developing methods, techniques or processes for retrieving and/or accessing feature values for probe points and/or road links from one or more sources may be employed by the map matching platform 101.

By way of example, the vehicles 105, the UEs 107, the map matching platform 101, the services platform 119, and/or the content providers 121 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
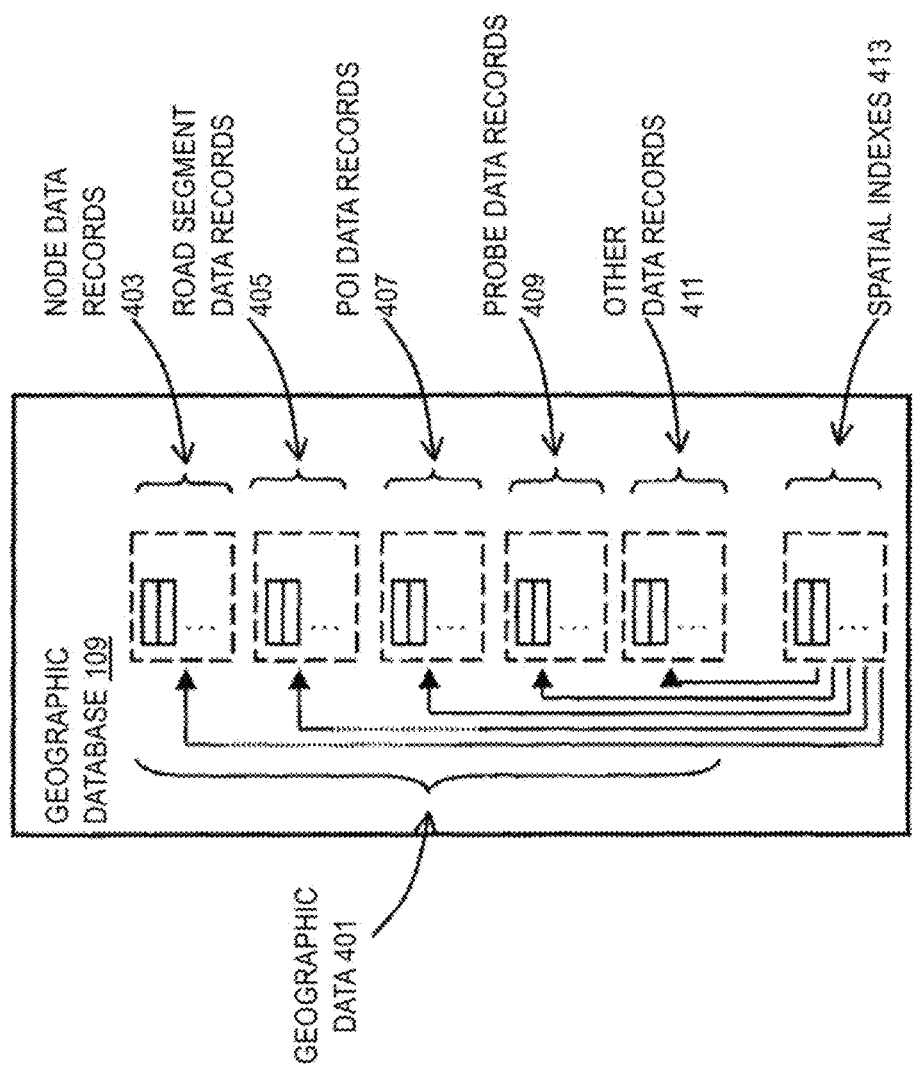
FIG. 4 is a diagram of a geographic database, according to one embodiment.

FIG. 4 is a diagram of the geographic database 103 of system 100, according to exemplary embodiments. In the exemplary embodiments, POIs and map generated POIs data can be stored, associated with, and/or linked to the geographic database 103 or data thereof In one embodiment, the geographic database 103 includes geographic data 401 used for (or configured to be compiled to be used for) mapping and/or navigation-related services, such as for personalized route determination, according to exemplary embodiments. For example, the geographic database 103 includes node data records 403, road segment or link data records 405, POI data records 407, probe data records 409, and other data records 411, for example. More, fewer or different data records can be provided. In one embodiment, the other data records 411 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using the point-based map matching embodiments describes herein), for example.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three dimensional polygon extrusions, models, routes, etc. Accordingly, the terms polygons and polygon extrusions/models as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node or vertex. Also, there are no duplicated shape points, nodes, or links.

Two links that connect each other have a common node or vertex. In the geographic database 103, overlapping geographic features are represented by overlapping polygons. When polygons overlap, the boundary of one polygon crosses the boundary of the other polygon. In the geographic database 103, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In exemplary embodiments, the road segment data records 405 are links or segments representing roads, streets, or paths, as can be used in the calculated route or recorded route information for determination of one or more personalized routes, according to exemplary embodiments. The node data records 403 are end points or vertices corresponding to the respective links or segments of the road segment data records 405. The road link data records 405 and the node data records 403 represent a road network, such as used by vehicles, cars, and/or other entities. Alternatively, the geographic database 103 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 407. The geographic database 103 can also include data about places, such as cities, towns, or other communities, and other geographic features, such as bodies of water, mountain ranges, etc. Such place or feature data can be part of the POI data records 407 or can be associated with POIs or POI data records 407 (such as a data point used for displaying or representing a position of a city). In addition, the geographic database 103 can include data from radio advertisements associated with the POI data records 407 and their respective locations in the radio generated POI records 409.

In one embodiment, the geographic database 103 includes probe data records 409 which store probe point data, probe feature/attribute values, feature set data, map matching classifications, and/or related information. For example, the probe data records 409 can store collected probe point data for map matching, and/or the ground truth probe point data collected to train a machine learning classifier of the map matching platform 101. In yet another embodiment, the probe data records 409 can store processed probe point data into data buckets for matched probe points and for unmatched probe points.

The geographic database 103 can be maintained by the content provider 121 in association with the services platform 119 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database 103 or data in the master geographic database 103 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 105 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 103 can be a master geographic database, but in alternate embodiments, the geographic database 103 can represent a compiled navigation database that can be used in or with end user devices (e.g., vehicle 105, UE 107, etc.) to provide navigation-related functions. For example, the geographic database 103 can be used with the end user device to provide an end user with navigation features. In such a case, the geographic database 103 can be downloaded or stored on the end user device (e.g., vehicle 105, UE 107, etc.), such as in application 113, or the end user device can access the geographic database 103 through a wireless or wired connection (such as via a server and/or the communication network 111), for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device (e.g., UE 107) can be a cellular telephone. An end user can use the device navigation functions such as guidance and map display, for example, and for determination of route information to at least one identified point of interest, according to exemplary embodiments.

Figure 5:
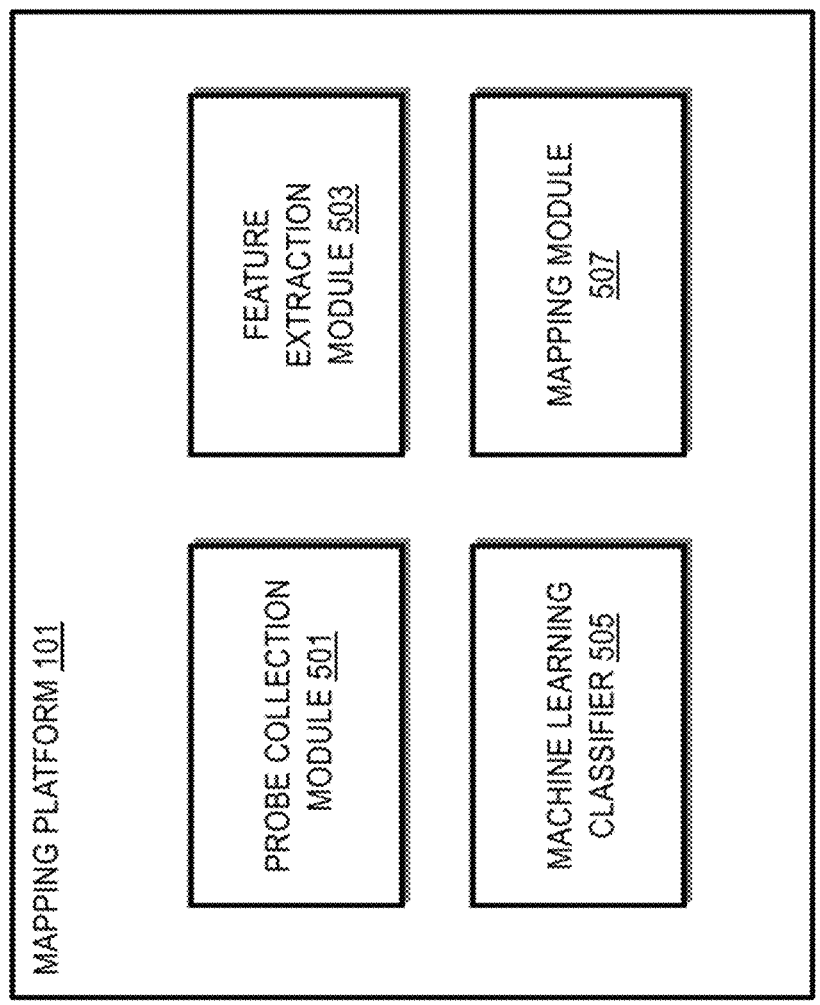
FIG. 5 is a diagram of the components of a map matching platform, according to one embodiment.

FIG. 5 is a diagram of the components of a map matching platform 101, according to one embodiment. By way of example, the map matching platform 101 includes one or more components for point-based map matching using a machine learning approach according to the various embodiments described herein. It is contemplated that the functions of these components may be combined or performed by other components of equivalent functionality. In this embodiment, the map matching platform 101 includes a probe collection module 501, a feature extraction module 503, a machine learning classifier 505, and a mapping module 507. The above presented modules and components of the map matching platform 101 can be implemented in hardware, firmware, software, or a combination thereof. Though depicted as a separate entity in FIG. 1, it is contemplated that the map matching platform 101 may be implemented as a module of any of the components of the system 100 (e.g., a component of the vehicle 105 and/or the UE 107). In another embodiment, one or more of the modules 501-507 may be implemented as a cloud based service, local service, native application, or combination thereof. The functions of these modules are discussed with respect to FIGS. 6-8 below.

In one embodiment, the map matching platform 101 can map match on a point-by-point basis (e.g., in real-time as each probe point is collected), or a bulk processing mode (e.g., processing a large number of probe points in a batch process). When performing bulk matching of probe points, the map matching platform 101 can perform point-based map matching in a stepwise manner that traverses a given area of a map (e.g., a map tile) on a link-by-link basis. To support either mode of operation, several data structures and functions can be defined. For example, a feature data structure can be defined to hold a feature set for each probe point.

In addition, in one embodiment, the map matching platform 101 can define various functions. For example, because the bulk matching approach traverses a geometry of the link to define matching candidate probe points within a circular radius (CR) of a reference point on the link (e.g., a vertex or node of the link), the map matching platform 101 can define a function Link(vertex, PL) computing features for each probe point $p_i$ where PL is a polyline representing a road segment and identified by a link identifier, and where vertex is a center of a circle with radius CR. A second function next(vertex,PL) returns the next vertex on the PL or link.

To begin bulk classification, the probe collection module 501 creates a spatial index for all probe points in a given area of the map (e.g., an area corresponding to a map tile) that is currently being processed. By way of example, the spatial index data structure can be based on any structure including, but not limited to: Kd-trees, R-trees, and Quadtrees. Each of the types of structures may have advantages and disadvantages with respect to point-based map matching, and the map matching platform 101 can balance these advantages/disadvantages to select an appropriate data structure. For example, with respect to Kd-trees, the advantages are that implementation can be simple, and indexing time can be extremely fast; while disadvantages are that this results in an unbalanced tree, unless sorting of input is precomputed, which can slow query times on non-uniform data. With respect to R-trees, the advantages are that this results in a balanced tree, which in turn can provide fast query times; while the disadvantages are that depending on the heuristic picked for insertion, indexing time may be slower, and implementation of R-trees can be complex. With respect to Quadtrees, the advantages are that indexing and implementation can be relatively simple; while the disadvantages are that this results in an unbalanced tree which can slow query times on unbalanced data.

In one embodiment, after creating the feature data structure and the spatial index, the probe collection module 501 can also create a data structure representing a hash map of each candidate probe point and link pair to match, e.g., by creating a hash map Candidates_hash-key (probeid,linkid) value(Feature set), wherein probeid identifies the candidate probe point and linkid identifies the candidate link against which a matching probability is to be calculated. In one embodiment, the map matching platform 101 can keep the hash map in an operating memory (e.g., RAM memory) to provide quick access and response times when accessing the hash map. In one embodiment, the map matching platform 101 can balance having a larger set of candidate probe points (e.g., by increasing the CR) against the number of spatial searches to perform. For example, have a larger CR and therefore a larger number candidates in the spatial index at one time will decrease the number of spatial searches that are to be performed to processed the an equivalent geographic area, and vice versa. The map matching platform can then proceed to the process of FIG. 6.

Figure 6:
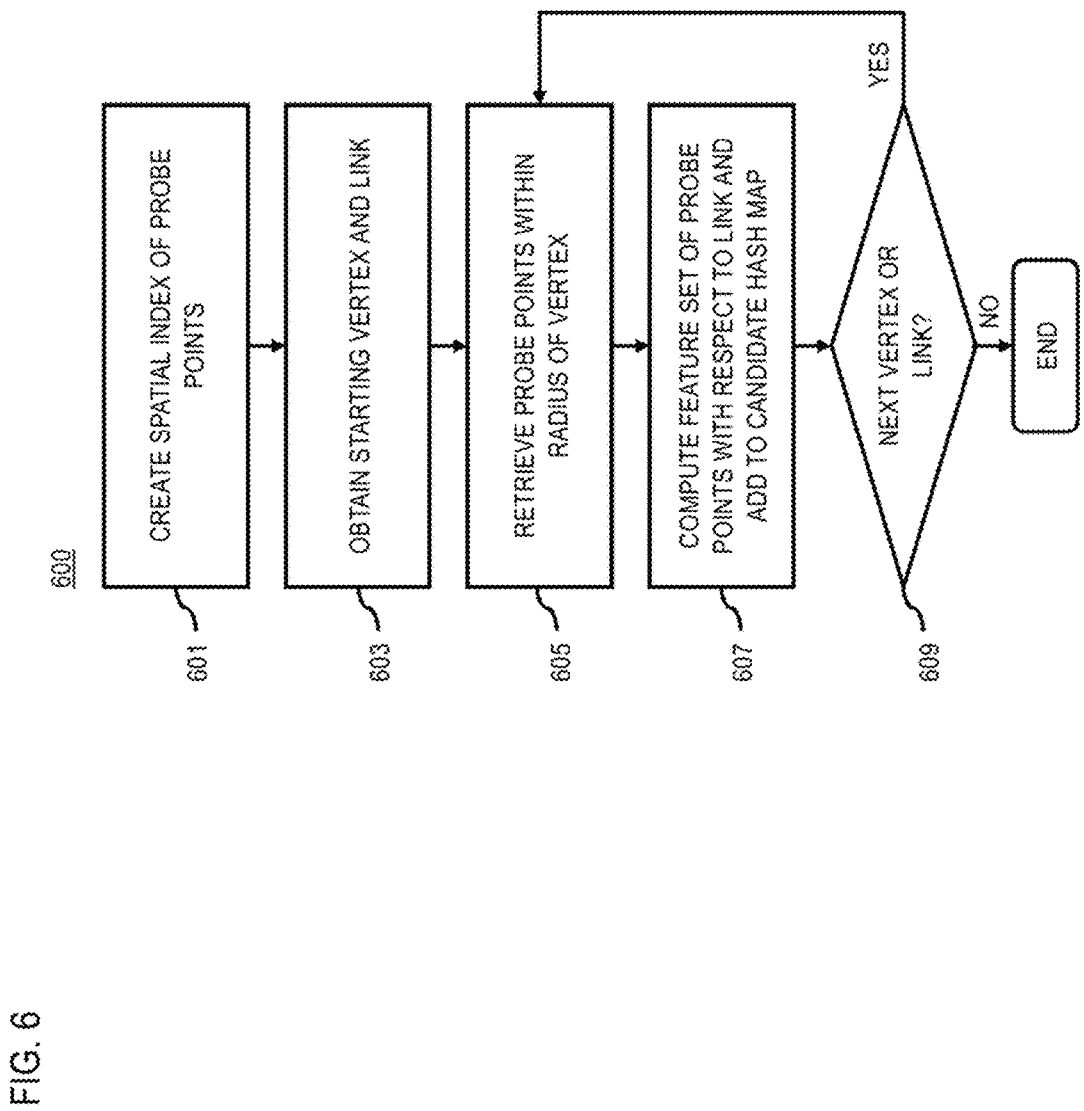
FIG. 6 is a flowchart of a process for feature collection for providing a machine learning approach to point-based map-matching, according to one embodiment.
Figure 12:
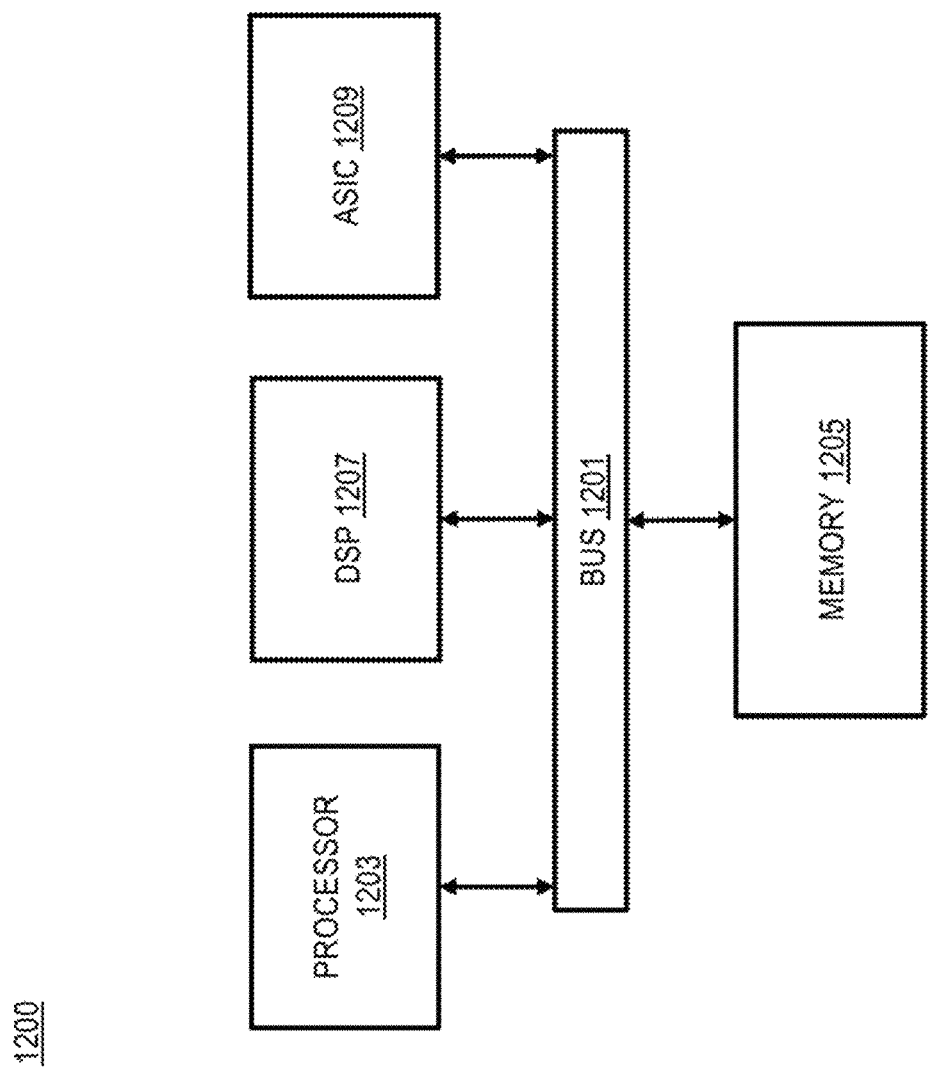
FIG. 12 is a diagram of a chip set that can be used to implement an embodiment.

FIG. 6 is a flowchart of a process for feature collection for providing a machine learning approach to point-based map-matching, according to one embodiment. In various embodiments, the map matching platform 101 and/or any of the modules 501-507 of the map matching platform 101 as shown in FIG. 5 may perform one or more portions of the process 600 and may be implemented in, for instance, a chip set including a processor and a memory as shown in FIG. 12. As such, the map matching platform 101 and/or the modules 501-507 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In step 601, the probe collection module 501 creates the spatial index of probe points as indicated above. In one embodiment, the spatial index can include a collection of previously collected probe points (e.g., when processing in bulk mode), or can include one or more probe points collected in real-time (e.g., when processing in real-time mode).

In step 603, the probe collection module 501 obtains a starting vertex and link of a set of links in a geographic area against which the probe points are to be map matched. The geographic area can include, for instance, the links within an area corresponding to a map tile when a tile-based representation of map data is used by the geographic database 103. In one embodiment, the starting vertex and link can be obtained using the function Link(vertex,PL) described above.

In step 605, the probe collection module 501 retrieves probe points with proximity (e.g., a CR) of the starting vertex and link. For example, the probe collection module 501 queries the spatial index of probe points (e.g., Probe_index) for probe points falling within the CR from the starting vertex and link. The resulting set of probe points can be stored in a data structure (e.g., a data structure labeled neighbors, such that neighbors=Probe_index(CR,PL)).

In step 607, for each probe point p in neighbors, the feature extraction module 503 computes a feature set f using a candidate pair of probe point p and Link(vertex, PL). In one embodiment, the feature set can include extracted features values of any combination of probe attributes, link attributes, and/or combined probe/link attributes discussed above for each probe/link pair. The resulting feature set is then stored in the feature set data structure and referenced in the candidates hash map (e.g., candidates_hash).

At step 609, the feature extraction module 503 continues to the next vertex of the current link, and the next link in the geographic areas to be processed until all vertices and links are processed to extract the feature sets for all corresponding probe/link pairs. In one embodiment, the geographic area to be processed is a map M, that can be traversed by the feature extraction module 503 for processing. In one embodiment, traversal strategies can include, but are not limited to, breadth first (e.g., processing the starting vertices of all links first, and then returning to each link for remaining vertices), or depth first (e.g., processing all vertices of each link before moving to the next link).

Example pseudocode that summarizes the feature collection process 600 of FIG. 6 is provided in Table 1 below.

TABLE 1

```
//FEATURE COLLECTION step
//Walk through the map M (Breadth First
or Depth First strategy are options)
for each link in Map
{
  Obtain starting vertex and PL
  while vertex in PL
  {
    Query Probe_index with CR
    neighbors = Probe_index(CR, PL)
    for each p in neighbors
    {
      Compute feature set f using p
      and Link(vertex,PL)
      Add to candidates_hash
    }
    vertex = next(vertex, PL)
  }
  next(PL)
}
```

Figure 7:
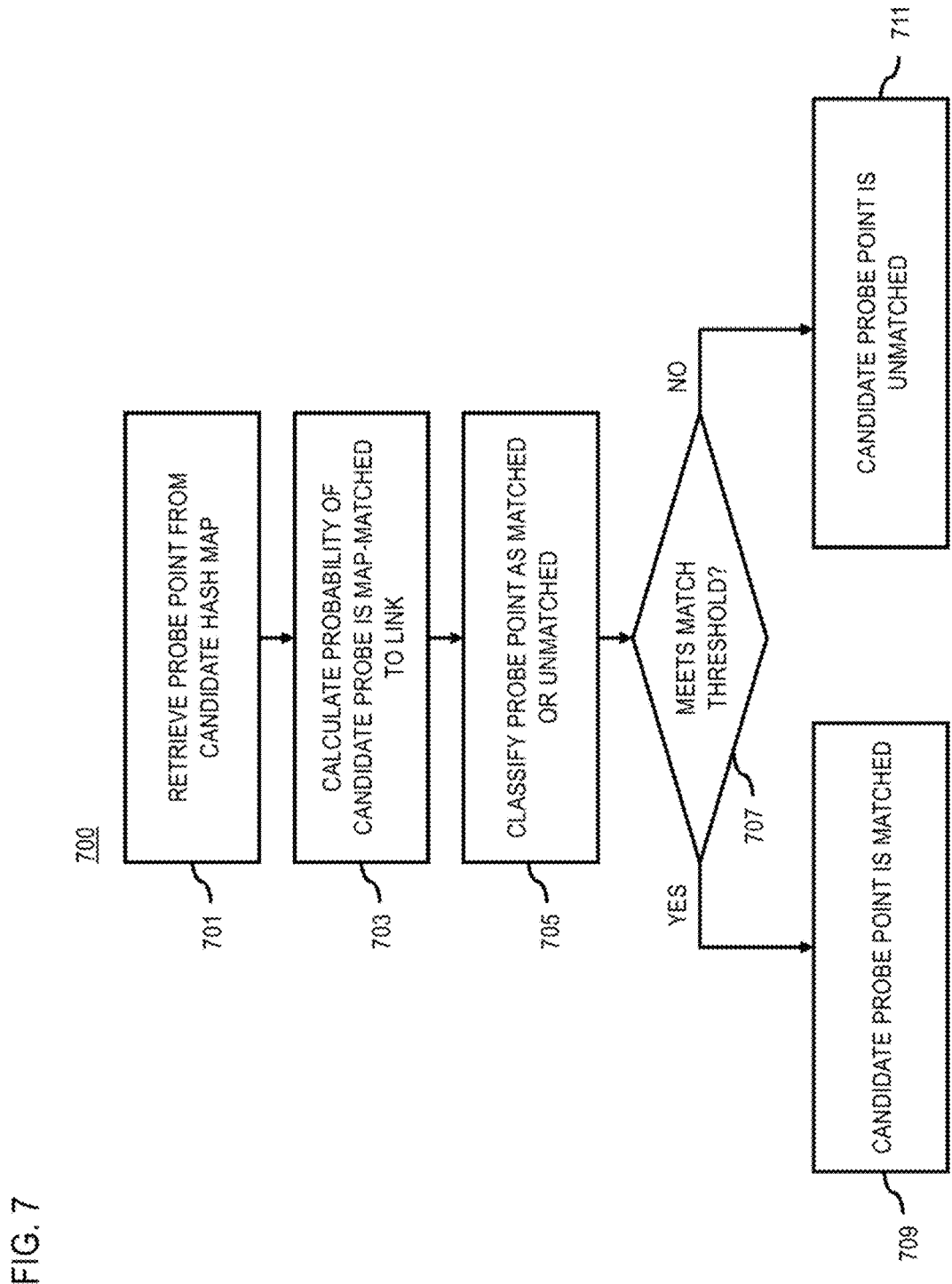
FIG. 7 is a flowchart of a process for classifying probe points based on collected features using machine learning, according to one embodiment.

FIG. 7 is a flowchart of a process for classifying probe points based on collected features using machine learning, according to one embodiment. In various embodiments, the map matching platform 101 and/or any of the modules 501-507 of the map matching platform 101 as shown in FIG. 5 may perform one or more portions of the process 700 and may be implemented in, for instance, a chip set including a processor and a memory as shown in FIG. 12. As such, the map matching platform 101 and/or the modules 501-507 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

In one embodiment, the map matching platform 101 performs the classification process 700 after the feature collection process 600 of FIG. 6.

In step 701, for each candidate pair of probe point/link in the candidates hash map generated during the process 600 above (e.g., Candidates_hashmap), the machine learning classifier 505 retrieves a corresponding feature set for the candidate pair. Using, for instance, the retrieved feature for a candidate probe point (e.g., a probe point i) and link (e.g., link j), the machine language classifier 505 calculates a likelihood that the candidate probe point is matched to the candidate link (e.g., $L_{ij}(f)$) (step 703). In this example, the classifier 505 uses a machine learning model (e.g., logistic regression, RandomForest, etc.) that has been trained using a set of probe/link features as discussed with respect to the various embodiments described above with the feature set of the candidate probe point/link pair, to calculate the likelihood or probability of matching between the probe point and the link of the candidate pair.

In step 705, the machine learning classifier 505 can then classify whether the candidate probe point/link pair are matched or unmatched based on the calculated likelihood or probability of matching. In one embodiment, the classification can be performed using a function, e.g., $c=Class(p, L_{ij}(f))$, where c is the classification for a probe point p, given a calculated likelihood of matching $L_{ij}(f)$). The classification function can apply a matching threshold or other criteria to determine the classification (step 707), so that candidate probe/link pairs with calculated matching probabilities greater than this threshold can be classified as matched (e.g., the candidate probe point is map matched to the candidate link of the pair) (step 709. Otherwise, if the matching threshold is not met, then the candidate probe point/link pair is classified as unmatched (step 711).

In one embodiment, the results of the classification of matched or unmatched can be added or stored in a data structure (e.g., candidates_classified). This classification data structure can then be used, for instance, to determine separate matched and unmatched buckets of probe points. In one embodiment, the unmatched bucket can then be used in other map data development pipelines, for instance, to determine new or changed geometries, filter noise in the probe data, etc.

Example pseudocode that summarizes the classification process 700 of FIG. 7 is provided in Table 2 below.

TABLE 2

```
//CLASSIFICATION step
for each candidate in candidates_hash
{
  Calculate likelihood  Lij(f)
  Classify candidate as matched/
  unmatched   c = Class(p, Lij(f))
  Add to candidates_classified
}
Add to candidates_classified points
outside of CR as "unmatched" with
high confidence
Consolidate results into matched/
unmatched buckets
```

Figure 8:
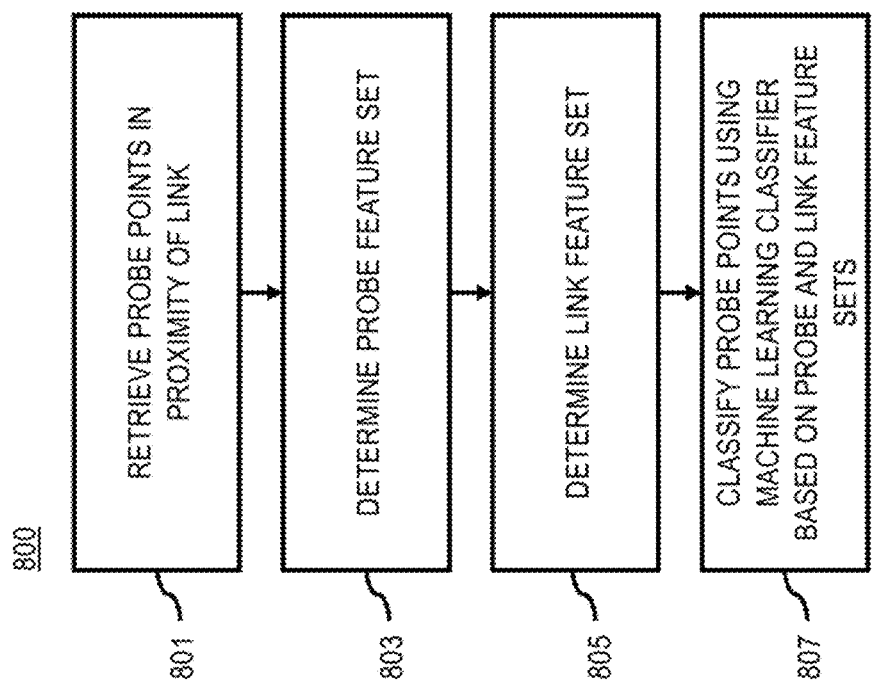
FIG. 8 is a flowchart of a general process for providing a machine learning approach to point-based map-matching, according to one embodiment.

FIG. 8 is a flowchart of a general process for providing a machine learning approach to point-based map-matching, according to one embodiment. In various embodiments, the map matching platform 101 and/or any of the modules 501-507 of the map matching platform 101 as shown in FIG. 5 may perform one or more portions of the process 800 and may be implemented in, for instance, a chip set including a processor and a memory as shown in FIG. 12. As such, the map matching platform 101 and/or the modules 501-507 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all of the illustrated steps.

The process 800 provides a general approach to machine learning classification of probe points for point-based matching discussed in the various embodiments described above.

In step 801, the probe collection module 501 retrieves one or more probe points collected within a proximity to a map feature represented by a link of a geographic database. In one embodiment, the one or more probe points are collected from one or more sensors of a plurality of devices (e.g., vehicles 105, UE 107, and/or any other probe device/vehicle) traveling within the proximity to the map feature. In one embodiment, the proximity to the map feature is determined by an area delimited by a radius extending from a vertex of the link. The link, for instance, can be a link of a geographic database 103 that corresponds to a road/path segment.

In addition or alternatively, in one embodiment, the link record can instead be a record indicating a geographic feature (e.g., a polygon representing a geographic boundary of a point of interest such as a building, event venue, etc.). In this way, the machine learning approach to point-based map matching can be used, for instance, to map probe points to specific geographic features. For example, when mapped to a feature such as an event venue, a large number of probe points matched to that venue at a certain period of time may be indicative of an occurrence of an event. Accordingly, the embodiments described herein can be used to determine events or other incidents that can be indicated by map-matched probe points at a given area.

In step 803, the feature extraction module 503 determines a probe feature set for each of the one or more probe points. In one embodiment, the probe feature set comprises respective values for one or more probe attributes of said each probe point. The probe attributes or features are can be any characteristic of a probe point, a device collecting the probe point data, and/or other contextual information about the probe point data, such as the probe features discussed in the various embodiments described above. For example, in one embodiment, the feature extraction module 503 extracts the probe feature set from location sensor data of said each probe point (e.g., location, heading, timestamp, sensor type, sensor vendor, altitude, etc.).

In step 805, the feature extraction module 503 also determines a link feature set for the link. In one embodiment, the link feature set comprises respective values for one or more link attributes of the link such as those discussed with respect to the embodiments described above (e.g., function class, ramp, multi-digit, intersection internal, urban/suburban, region, navigability, etc.). In one embodiment, the feature extraction module 503 extracts the link feature set from the geographic database. In other words, the link feature set can be determined by querying the geographic database 103 or other equivalent database for stored link attribute values.

In one embodiment, as previously describe, there are certain attributes or features that can calculated from a given probe point and link pair. This pair, for instance, represents a candidate probe point and the candidate link against which it is being evaluated as for map matching. For example, the feature extraction module 503 calculates one or more combined link and probe attributes, for instance, from the probe and link features of each candidate pair. In one embodiment, the one or more combined link and probe attribute include a perpendicular distance between said each probe point and the candidate link, an angle difference between a heading of said each probe point and a bearing of the link, a ratio of a speed of said each probe point and a median speed of the link, or a combination thereof.

In step 807, the machine learning classifier 505 classifies said each probe point to determine a matching probability based on the probe feature set, the link feature, and/or the combined probe/link features. In one embodiment, the matching probability indicates a probability that said each probe point is classified as map-matched to the candidate link. As previously described, the matching learning classifier 505 uses a trained machine learning model to calculate the matching probability. For example, the machine learning classifier 505 is trained using ground truth data comprising reference probe points with known map-matches to respective reference links, and comprising known values of the one or more probe attributes for the reference probe points and known values of the one or more link attributes for the reference links.

In one embodiment, the specific model (e.g., logistic regression, RandomForest, etc.) used by the machine learning classifier 505 can vary to include any type of model known in the art. However, as previously discussed, different models can result in different calibrations of the resulting matching probabilities. For example, some models (e.g., logistic regression) are well-calibrated across the entire range of probabilities from 0 to 1, when others may be biased near 0 or 1 (e.g., RandomForest). In one embodiment, in one embodiment, the machine learning classifier 505 can calibrate the matching probability generated by the model based a classifier or model type of the machine learning classifier. This calibration can be performed, for instance, during post-processing following training of the machine learning classifier 505.

In one embodiment, the mapping module 507 optionally divides the one or more probe points into a map-matched set and an unmatched set by applying a threshold value on the matching probability for said each probe point. The mapping module 507 then processes the unmatched set of the one or more probe points to identify a new or changed geometry of a transportation network represented in the geographic database. In addition or alternatively, the unmatched set can also be processed to determine any other map attribute of the geographic database. For example, when speed ratio is incorporated as a feature of the machine learning classifier 505, the unmatched set can be a set of candidate probe points where the map speed limit is not correct. In this way, the mapping module 507 can find speed limit changes on the map based on areas or locations corresponding to the unmatched set. It is also contemplated that the unmatched set can be used for any other function of the map development pipeline including, but not limited to, filtering noise, determining outliers, evaluating probe data provider quality, etc.

In one embodiment, the matched set can be used to locate a vehicle 105 that generated the probe points in the set. For example, the probe point can be collected from a vehicle 105 (e.g., an autonomous vehicle) as it travels in a road network. The map matching results of the probe points collected from the vehicle 105 can then represent an estimation of the location of the vehicle 105. In one embodiment, the machine learning classifier 505 can be trained on features or attributes related to sensor data from the vehicle 105 such as, but not limited to, distance from objects whose locations have been precisely mapped (e.g., in an HD Map). By way of example, the objects include traffic signs, traffic lights, other cars, etc. Depending on which features are used, the location estimate can provide localization of the vehicle 105 to specific lanes of the roadway, or to within the levels of accuracy (e.g., centimeter level accuracy) typically required for autonomous operation of vehicles.

FIG. 9 is a diagram illustrating an example user interface displaying results of a machine learning approach to point-based map-matching, according to one embodiment. As shown, FIG. 9 depicts a user interface (UI) 901 that displays results of a point-based map matching for a set of probe points. The UI 901 includes, for instance, a column 903 identifying each probe point, a column 905 illustrating the matching probabilities for any potentially matched links, and a column 907 classifying each probe point as either matched or unmatched. In this example, the column 905 displays only those links whose matching probabilities are greater than zero or a configured minimum (e.g., greater than 0.05). Because in one embodiment each probe point is matched all links within a defined geographic area (e.g., a circular radius, a map tile, etc.), matching probabilities are calculated for each possible pair or probe points and links. The UI 901 displays the matching probabilities for each probe point/link with the highest matching probability first. For example, Probe Point 1 is displayed with matching probabilities of 0.85 for Link 1 and 0.34 for Link 2. In one embodiment, the system 100 map matches the candidate probe point to the link with the highest matching probability greater than a matching threshold value (e.g., 0.50). Therefore, in the case of Probe Point 1, the map matched Link 1 because its matching probability to Probe Point 1 is greater than the threshold, while Link 2's matching probability is not above the threshold. Column 907 then indicates whether any resulting matching probability for a given probe point is above the matching threshold value.

Figure 10:
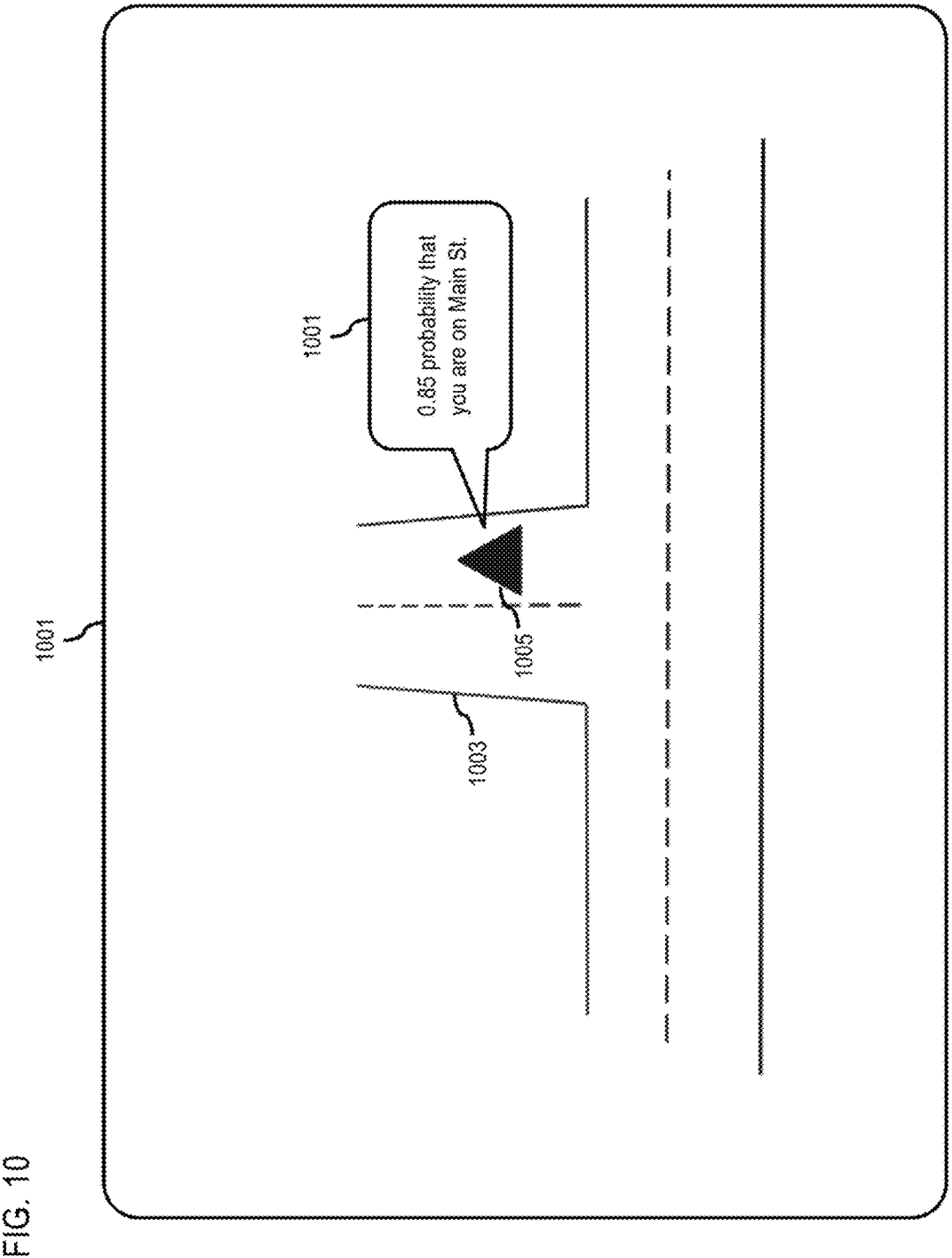
FIG. 10 is a diagram illustrating an example navigation user interface generated using a machine learning approach to point-based map-matching, according to one embodiment.

FIG. 10 is a diagram illustrating an example navigation user interface generated using a machine learning approach to point-based map-matching, according to one embodiment. FIG. 10 depicts an example use case of applying machine learning point-based map matching to an end-user navigation experience. The UI 1001 depicts a typical navigation user interface generated, for instance, by an in-vehicle or other navigation system as a vehicle travels within a road network. The navigation system samples the vehicle's location at various frequencies and reports each sample as a probe point. The map matching platform 101 can then use its machine learning approach to point-based map matching to match the sampled probe point in real-time to a given road segment or link in order to indicate in the UI 1001 which road segment the vehicle is traveling on. In this example, the map matching platform 101 map matches the sample probe point to the link corresponding to road segment 1003 with 0.85 matching probability. Accordingly, the UI 1001 is updated to display an icon 1005 on a representation of the road segment 1003 to indicate that the vehicle traveling on the road segment 1003. In addition, the UI 1003 can display a notification indicating the predicted matching probability or confidence associated with the navigation system's depiction of the vehicle on the roadway. In this way, the user can be informed of the degree of confidence the navigation system has of vehicles current location, which can be helpful, particular near intersections or other complicated portions of the roadway.

The processes described herein for providing a machine learning approach to point-based map matchers may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
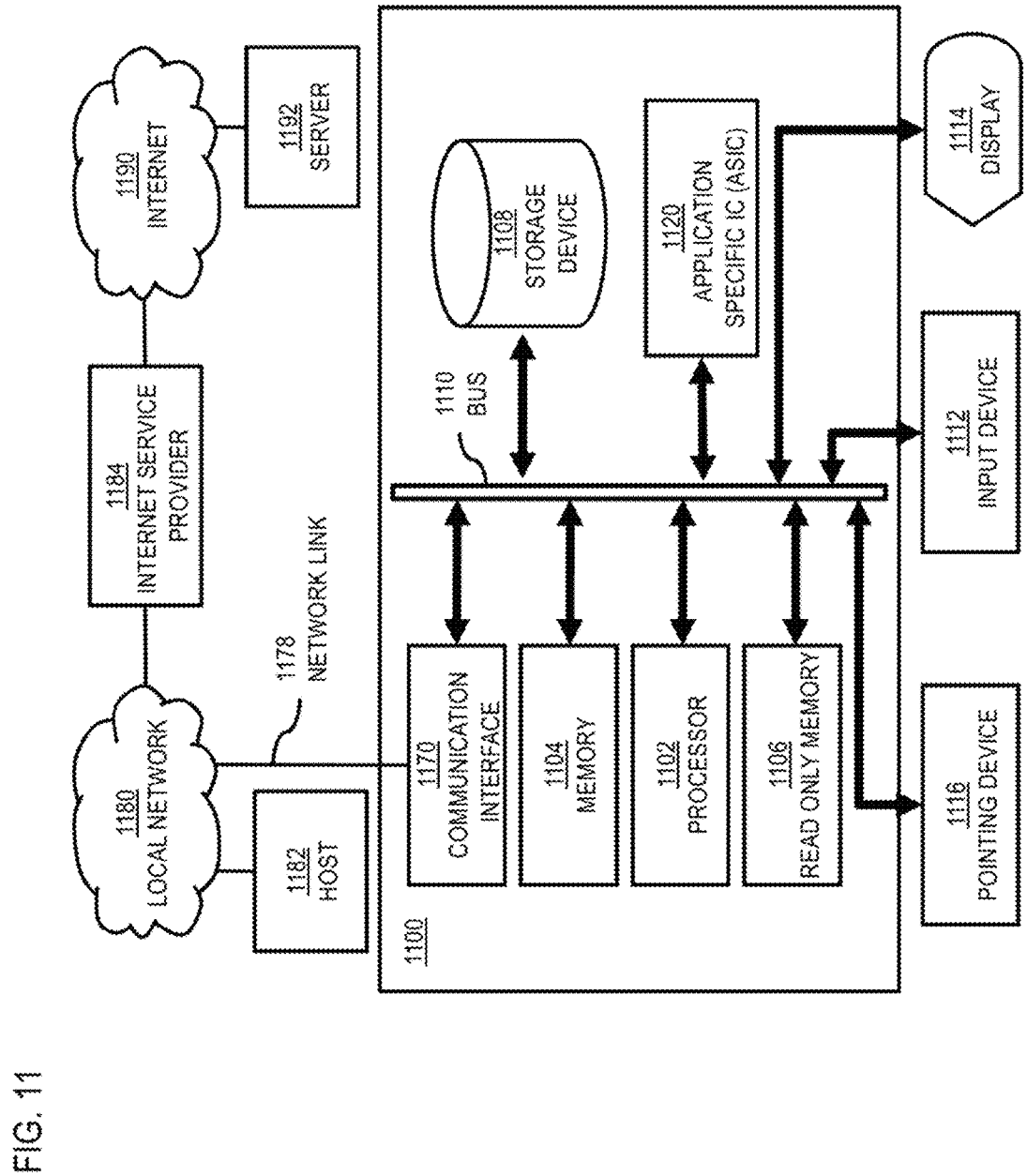
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide a machine learning approach to point-based map matchers as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing a machine learning approach to point-based map matchers. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing a machine learning approach to point-based map matchers. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing a machine learning approach to point-based map matchers, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 111*a* for providing a machine learning approach to point-based map matchers.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to provide a machine learning approach to point-based map matchers as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide a machine learning approach to point-based map matchers. The memory 1205 also stores the data associated with or generated by the execution of the inventive steps.

Figure 13:
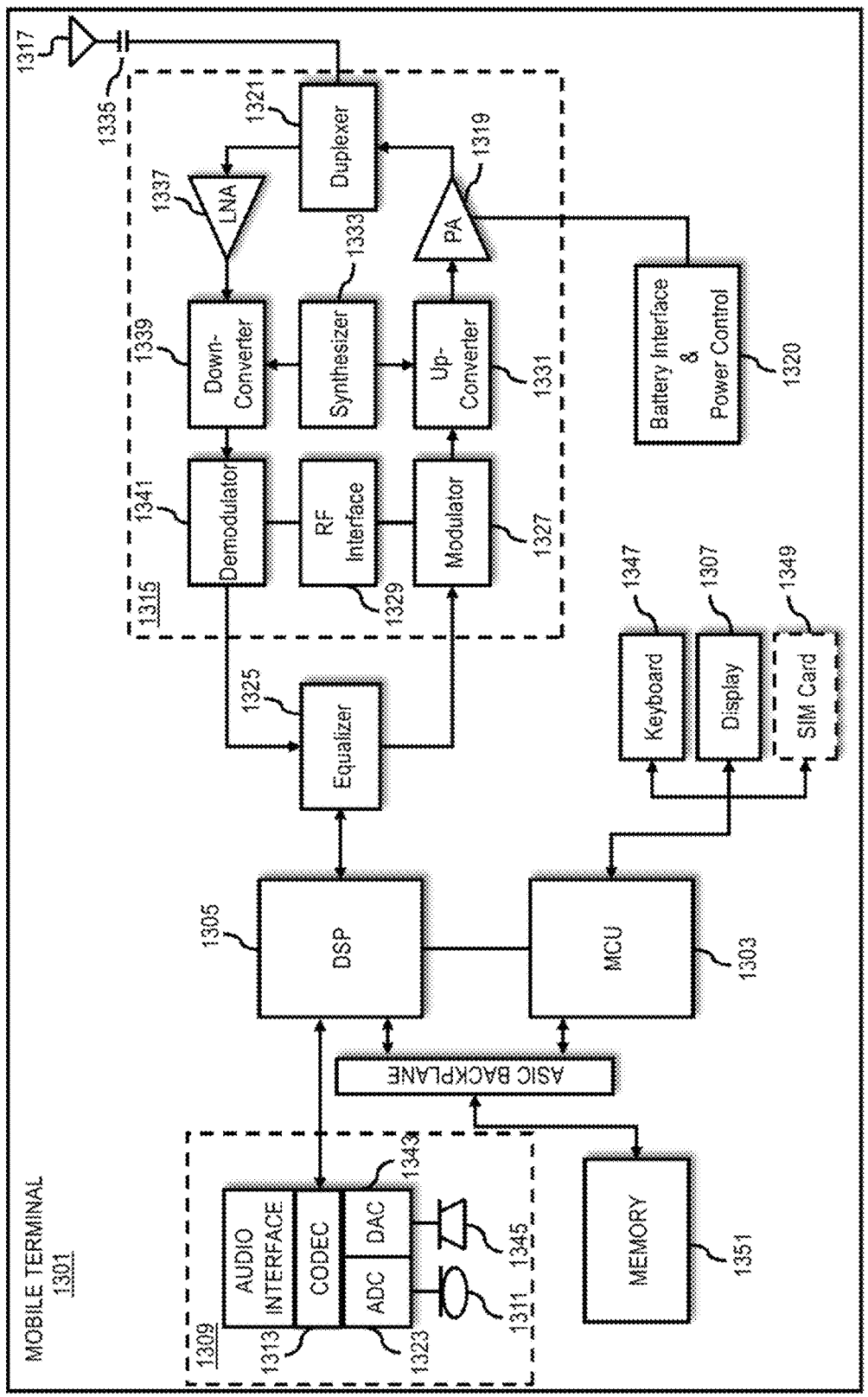
FIG. 13 is a diagram of a mobile terminal (e.g., handset) that can be used to implement an embodiment.

FIG. 13 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide a machine learning approach to point-based map matchers. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for map-matching probe data using a machine learning classifier, comprising:
   retrieving one or more probe points collected within a proximity to a map feature represented by a link of a geographic database, wherein the one or more probe points are collected from one or more sensors of a plurality of devices traveling within the proximity to the map feature;
   determining a probe feature set for each of the one or more probe points, wherein the probe feature set comprises respective values for one or more probe attributes of said each probe point;
   determining a link feature set for the link, wherein the link feature set comprises respective values for one or more link attributes of the link;
   classifying, using the machine learning classifier, said each probe point to determine a matching probability based on the probe feature set and the link feature,
   wherein the matching probability indicates a probability that said each probe point is classified as map-matched to the link;
   wherein the machine learning classifier is trained using ground truth data comprising reference probe points with known map-matches to respective reference links, and comprising known values of the one or more probe attributes for the reference probe points and known values of the one or more link attributes for the reference links; and
   creating a hash map that associates each pair of said each probe point and the link respectively with a corresponding one of the probe feature set and the link feature set.

2. The method of claim 1, further comprising:
   dividing the one or more probe points into a map-matched set and an unmatched set by applying a threshold value on the matching probability for said each probe point.

3. The method of claim 1, further comprising:
   processing the unmatched set of the one or more probe points to identify a new geometry, a map attribute, or a combination thereof of a transportation network represented in the geographic database.

4. The method of claim 1, further comprising:
   calibrating the matching probability based a classifier type of the machine learning classifier.

5. The method of claim 1, further comprising:
   extracting the probe feature set from location sensor data of said each probe point.

6. The method of claim 1, further comprising:
   extracting the link feature set from the geographic database.

7. The method of claim 1, further comprising:
   calculating one or more combined link and probe attributes,
   wherein the classifying of said each probe point, a training of the machine learning classifier, or a combination thereof is further based on the one or more combined link and probe attributes; and
   wherein the one or more combined link and probe attribute include a perpendicular distance between said each probe point and the link, an angle difference between a heading of said each probe point and a bearing of the link, a ratio of a speed of said each probe point and a median speed of the link, or a combination thereof.

8. The method of claim 1, wherein the proximity to the map feature is determined by an area delimited by a radius extending from a vertex of the link.

9. The method of claim 1, further comprising:
   maintaining the hash map in a memory of the machine learning classifier during the classifying of the one or more probe points.

10. An apparatus for map-matching probe data using a machine learning classifier, comprising:
    at least one processor; and
    at least one memory including computer program code for one or more programs,
    the at least one memory and the computer program code configured to, with the at least one processor, cause the apparatus to perform at least the following,
       retrieve one or more probe points collected within a proximity to a map feature represented by a link of a geographic database, wherein the one or more probe points are collected from one or more sensors of a plurality of devices traveling within the proximity to the map feature;
       determine a probe feature set for each of the one or more probe points, wherein the probe feature set comprises respective values for one or more probe attributes of said each probe point;
       determine a link feature set for the link, wherein the link feature set comprises respective values for one or more link attributes of the link;
       classify, using the machine learning classifier, said each probe point to determine a matching probability based on the probe feature set and the link feature,
       wherein the matching probability indicates a probability that said each probe point is classified as map-matched to the link;
       wherein the machine learning classifier is trained using ground truth data comprising reference probe points with known map-matches to respective reference links, and comprising known values of the one or more probe attributes for the reference probe points and known values of the one or more link attributes for the reference links; and
       create a hash map that associates each pair of said each probe point and the link respectively with a corresponding one of the probe feature set and the link feature set.

11. The apparatus of claim 10, wherein the apparatus is further caused to:
    divide the one or more probe points into a map-matched set and an unmatched set by applying a threshold value on the matching probability for said each probe point.

12. The apparatus of claim 10, wherein the apparatus is further caused to:
process the unmatched set of the one or more probe points to identify a new geometry, a map attribute, or a combination thereof of a transportation network represented in the geographic database.

13. The apparatus of claim 10, wherein the apparatus is further caused to:
calculate one or more combined link and probe attributes,
wherein the classifying of said each probe point, a training of the machine learning classifier, or a combination thereof is further based on the one or more combined link and probe attributes; and
wherein the one or more combined link and probe attribute include a perpendicular distance between said each probe point and the link, an angle difference between a heading of said each probe point and a bearing of the link, a ratio of a speed of said each probe point and a median speed of the link, or a combination thereof.

14. The apparatus of claim 10, wherein the proximity to the map feature is determined by an area delimited by a radius extending from a vertex of the link.

15. The apparatus of claim 10, wherein the apparatus is further caused to:
maintain the hash map in a memory of the machine learning classifier during the classifying of the one or more probe points.

16. A non-transitory computer-readable storage medium for map-matching probe data using a machine learning classifier, carrying one or more sequences of one or more instructions which, when executed by one or more processors, cause an apparatus to at least perform the following steps:
retrieving one or more probe points collected within a proximity to a map feature represented by a link of a geographic database, wherein the one or more probe points are collected from one or more sensors of a plurality of devices traveling within the proximity to the map feature;
determining a probe feature set for each of the one or more probe points, wherein the probe feature set comprises respective values for one or more probe attributes of said each probe point;
determining a link feature set for the link, wherein the link feature set comprises respective values for one or more link attributes of the link;
classifying, using the machine learning classifier, said each probe point to determine a matching probability based on the probe feature set and the link feature,
wherein the matching probability indicates a probability that said each probe point is classified as map-matched to the link; and
wherein the machine learning classifier is trained using ground truth data comprising reference probe points with known map-matches to respective reference links, and comprising known values of the one or more probe attributes for the reference probe points and known values of the one or more link attributes for the reference links; and
creating a hash map that associates each pair of said each probe point and the link respectively with a corresponding one of the probe feature set and the link feature set.

17. The non-transitory computer-readable storage medium of claim 16, wherein the apparatus is further caused to perform:
dividing the one or more probe points into a map-matched set and an unmatched set by applying a threshold value on the matching probability for said each probe point.

18. The non-transitory computer-readable storage medium of claim 16, wherein the apparatus is further caused to perform:
processing the unmatched set of the one or more probe points to identify a new geometry, a map attribute, or a combination thereof of a transportation network represented in the geographic database.

19. The non-transitory computer-readable storage medium of claim 16, wherein the apparatus is further caused to perform:
calculating one or more combined link and probe attributes,
wherein the classifying of said each probe point, a training of the machine learning classifier, or a combination thereof is further based on the one or more combined link and probe attributes; and
wherein the one or more combined link and probe attribute include a perpendicular distance between said each probe point and the link, an angle difference between a heading of said each probe point and a bearing of the link, a ratio of a speed of said each probe point and a median speed of the link, or a combination thereof.

20. The non-transitory computer-readable storage medium of claim 16, wherein the proximity to the map feature is determined by an area delimited by a radius extending from a vertex of the link.

* * * * *